US011486672B2

(12) United States Patent
Geier

(10) Patent No.: US 11,486,672 B2
(45) Date of Patent: Nov. 1, 2022

(54) HANDHELD MEASUREMENT, SEARCH AND SAFETY DEVICE

(71) Applicant: Michael J. Geier, Loxahatchee, FL (US)

(72) Inventor: Michael J. Geier, Loxahatchee, FL (US)

(*) Notice: Subject to any disclaimer, the term of this patent is extended or adjusted under 35 U.S.C. 154(b) by 320 days.

(21) Appl. No.: 16/900,314

(22) Filed: Jun. 12, 2020

(65) Prior Publication Data

US 2021/0172695 A1 Jun. 10, 2021

Related U.S. Application Data

(60) Provisional application No. 62/861,131, filed on Jun. 13, 2019.

(51) Int. Cl.
| | |
|---|---|
| *F41A 23/08* | (2006.01) |
| *G01T 1/02* | (2006.01) |
| *B25J 1/04* | (2006.01) |
| *B25G 3/24* | (2006.01) |
| *F16M 13/04* | (2006.01) |
| *B25G 1/04* | (2006.01) |
| *B25G 1/06* | (2006.01) |
| *F41A 21/48* | (2006.01) |

(52) U.S. Cl.
CPC .............. *F41A 23/08* (2013.01); *B25G 1/04* (2013.01); *B25G 1/06* (2013.01); *B25G 3/24* (2013.01); *F16M 13/04* (2013.01); *G01T 1/02* (2013.01); *F41A 21/48* (2013.01)

(58) Field of Classification Search
CPC .. F41A 23/08; F41A 21/48; G01T 1/02; B25J 1/04; B25B 9/00; B25B 27/02; B25D USPC ............................................ 294/210, 26, 175
See application file for complete search history.

(56) References Cited

U.S. PATENT DOCUMENTS

| | | | | |
|---|---|---|---|---|
| 5,516,171 A | * | 5/1996 | Gray | ............................ B25J 1/04 294/24 |
| 5,590,923 A | * | 1/1997 | Berger | ....................... B25J 1/04 294/116 |
| 5,669,174 A | | 9/1997 | Teetzel | |
| 5,680,048 A | | 10/1997 | Wollny | |
| 6,050,626 A | | 4/2000 | Dudley | |
| 6,598,266 B1 | | 7/2003 | Elliott | |
| 6,880,251 B2 | | 4/2005 | Gambert | |
| 7,222,451 B2 | | 5/2007 | Keng et al. | |
| 7,310,060 B2 | | 12/2007 | Stilwell et al. | |

(Continued)

*Primary Examiner* — Paul T Chin
(74) *Attorney, Agent, or Firm* — John Rizvi; John Rizvi, P.A.—The Patent Professor®

(57) ABSTRACT

A handheld measurement, search and safety device that includes a main frame having a handle, an extendable member that slides outwards from the main frame in measured increments, and an interchangeable support brace comprising either a buttstock or arm brace to allow responders to use the extendable member to survey hazardous materials at a distance, or a one-handed configuration used to survey hazard materials in confined areas. The handheld measurement, search and safety device includes a plurality of picatinny rails disposed on both the main frame and extendable member to removably mount a host of different field survey instruments and/or tactical accessories for detecting, locating, identifying, measuring, or sampling hazardous materials including radioactive materials or toxic chemicals.

20 Claims, 33 Drawing Sheets

(56) References Cited

U.S. PATENT DOCUMENTS

| | | | |
|---|---|---|---|
| 7,685,756 B2 | 3/2010 | Moody et al. | |
| 7,802,392 B2 | 9/2010 | Peterson et al. | |
| 8,029,035 B1 * | 10/2011 | Bottner | B25J 1/04 |
| | | | 294/24 |
| 8,146,282 B2 | 4/2012 | Cabahug et al. | |
| 8,205,478 B1 * | 6/2012 | Hallisey | G08B 29/145 |
| | | | 73/1.06 |
| 8,414,846 B2 | 4/2013 | Gold et al. | |
| 8,464,399 B2 | 6/2013 | Herigstad | |
| 8,516,731 B2 | 8/2013 | Cabahug et al. | |
| 8,776,648 B2 | 7/2014 | Lee | |
| 9,057,583 B2 | 6/2015 | Matthews et al. | |
| 9,121,665 B2 | 9/2015 | Hinds | |
| 9,341,442 B1 * | 5/2016 | Geissele | F41C 27/18 |
| 9,797,688 B2 * | 10/2017 | Kennair, Jr. | F41G 11/003 |
| 9,828,734 B1 | 11/2017 | Bieberstein | |
| D808,486 S * | 1/2018 | Kafka | D22/103 |
| 10,071,470 B2 | 9/2018 | Arketa Zabala | |
| 10,113,837 B2 | 10/2018 | Masarik et al. | |
| 10,413,026 B1 * | 9/2019 | Grivna | E01H 1/12 |
| 2007/0068008 A1 | 3/2007 | Wu et al. | |
| 2008/0282507 A1 | 11/2008 | Chiasson et al. | |
| 2009/0038200 A1 | 2/2009 | Keng | |
| 2009/0224081 A1 | 9/2009 | Rossiter et al. | |
| 2010/0229448 A1 | 9/2010 | Houde-Walter et al. | |
| 2011/0099765 A1 | 5/2011 | Youssefieh | |
| 2012/0091174 A1 | 4/2012 | Breeze | |
| 2013/0113648 A1 | 5/2013 | Duvoisin, III et al. | |
| 2015/0041538 A1 * | 2/2015 | Teetzel | F41G 3/06 |
| | | | 235/404 |
| 2015/0198406 A1 | 7/2015 | Ling | |
| 2015/0198409 A1 * | 7/2015 | DeSomma | F41A 23/08 |
| | | | 42/71.01 |
| 2018/0292170 A1 | 10/2018 | Gagliano et al. | |

* cited by examiner

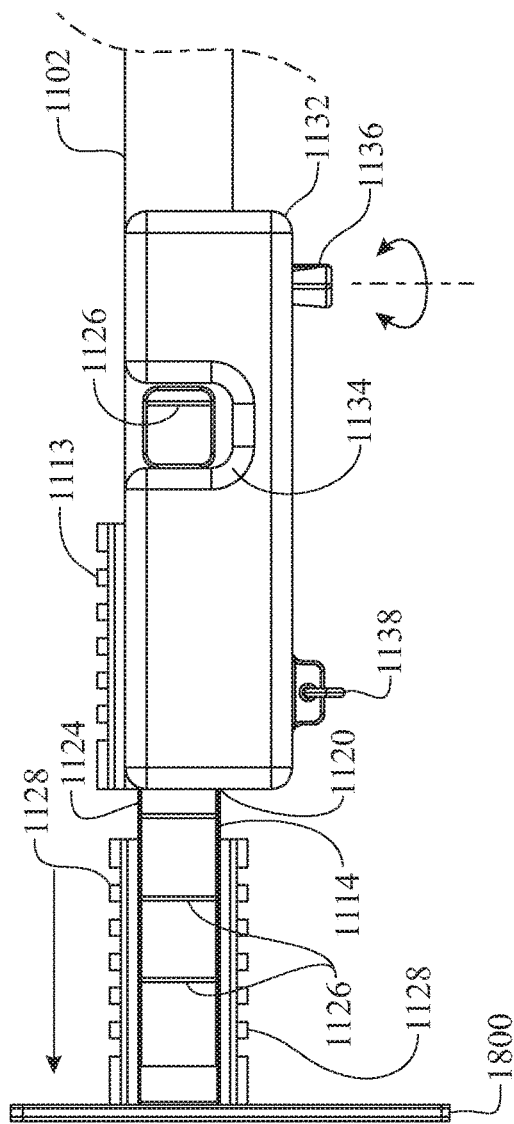
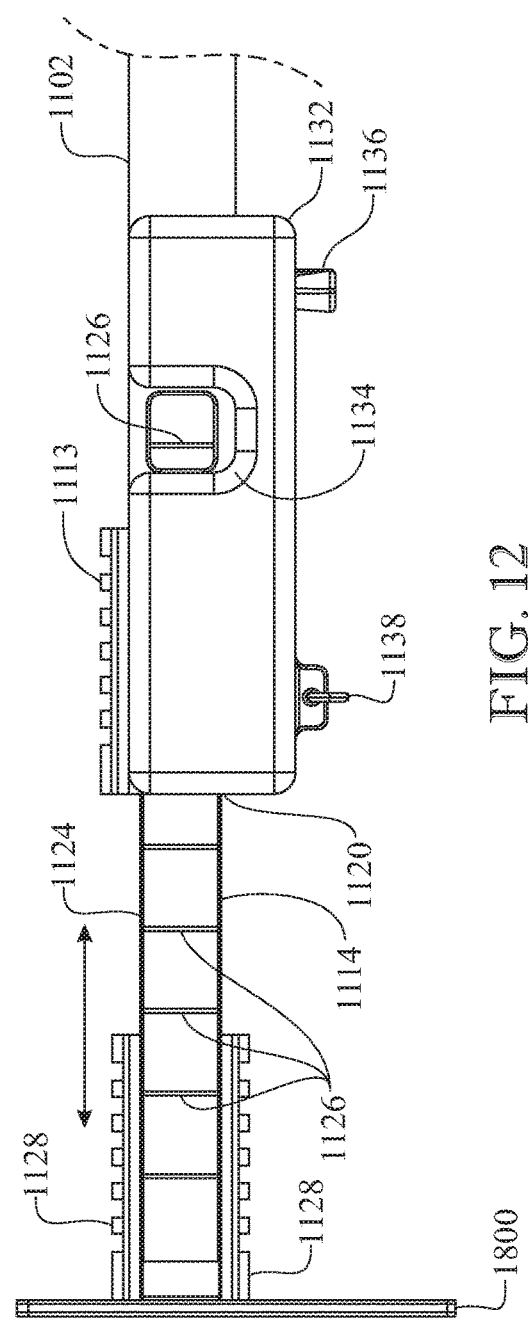

HANDHELD MEASUREMENT, SEARCH AND SAFETY DEVICE

CROSS-REFERENCE TO RELATED APPLICATIONS

This application claims the benefit of U.S. Provisional Patent Application Ser. No. 62/861,131, filed on Jun. 13, 2019, which is incorporated by reference herein in its entirety.

FIELD OF THE INVENTION

The present invention relates to devices for use in hazardous material applications, and more particularly, to a handheld measurement, search and safety device that is equipped with a variety of different field surveying instruments and tactical accessories, and field instruments to survey objects, people, vehicles, terrain, and buildings, from a distance or in confined areas, to detect, locate, measure, analyze, collect, identify, or monitor hazardous materials including radioisotope/radioactive materials or toxic chemicals.

BACKGROUND OF THE INVENTION

Emergency personnel and first responders are well-trained individuals that are often called upon to assist individuals, or to manage unsafe conditions in life-threatening or dangerous situations. The efforts of public safety personnel, such as public health officials or health physics specialists are also solicited in particular circumstances to access various situations and conditions that may adversely affect the safety and well-being of people. One particular happenstance involves exposure of dangerous hazardous materials that may include toxic chemicals, such as anthrax, or deadly radioactive materials to humans and the surrounding environment. First responders and police officers are often trained to follow prescribed protocols while dealing with dangerous substances, often calling on the local fire marshal, and other public health officials to further access and manage both presence of, and possible exposure to, such hazardous materials. Most firefighting companies, and other public safety agencies, are typically educated and trained to also follow prescribed protocols when responding to hazmat situations. In many hazardous situations, chemical hazards often emanate pungent smells that are often associated with visually identifiable solids, liquids, or gases. Yet another hazard of grave concern includes the presence of radioactive or radioisotope materials that can rise to unacceptable or dangerous levels posing unknowing damage, such as gamma rays, to humans or animals. The presence of such radioactive substances is generally deemed more deadly or omniscient, because radioactive materials are not detectable by one's senses, unlike the case with most chemical hazards. Radiation cannot be seen, heard, smelled, tasted, or felt, so simple inspection is insufficient to locate and identify radioactive materials. It is common knowledge that exposure to even low levels of certain types of radiation has been proven to cause cancer, birth defects, and a host of adverse medical conditions. Emergency responders are generally held to a higher standard of training when dealing with radioactive materials; yet they are often holding radiation detection instruments with their bare hands. Use of radioactive materials is often seen in industrial applications, in research and development, manufacturing processes, in hospitals, as well as, on a much larger scale, in nuclear power plant or reactor operations and plant decommissioning. As such, the safety of well-trained personnel performing tasks associated with radioactive materials is a matter of concern in military, industrial, healthcare, and nuclear power plant radiation applications.

There are various aspects of individual and environmental safety concerns when dealing with possible exposure to hazardous materials. First and foremost is the safety of emergency responders, public bystanders, animals, and the surrounding environment. In the context of radioactive materials, public safety personnel are often poised with the task of identifying, detecting, or measuring various objects or targets to determine whether a radioactive material is present at all before implementing proper containment and/or disposal management practices. There are situations in which well-trained personal employ radiation detection tools to survey suspicious individuals, packages, vehicles, buildings, bags or purses, shoes, terrain, or other areas in an effort to determine whether radioactive materials are present. With the ongoing concern of terrorist acts, it is not uncommon to see law enforcement and homeland security employ techniques to locate radioactive materials that may be present in bags or on people in airports, on people or in vehicles at border crossings, or even in packages designated for the post office. It is also vital to identify, detect, and measure radioactive materials that are often associated with the decommissioning of power plants, use of radiological dispersal devices, or in preventative radiological nuclear detection missions for detecting, locating, and identifying radioactive material outside of regulatory control. Thus, there is an on-going concern and need to survey decommissioned nuclear power plant component parts, tools, and materials, containment of buildings and in civil society the surrounding environment, monitor people, equipment, vehicles, and a variety of different objects for radioactive contamination in various known and unknown applications Safety personnel are generally equipped with standard tools and equipment to protect themselves from possible exposure to harsh, dangerous, and possibly life-threatening substances and chemicals. For example, responders often use protective barriers such as suits, hoods, gloves, and face shields to prevent hazardous materials from coming into contact with a person's eyes, hair, or skin. Pulmonary ventilation devices, such as, gas masks, or oxygen tanks, are also used to ventilate personnel and prevent inhalation of toxic chemical fumes or gases, or to oxygenate individuals who are exposed to such gases or fumes. There are a host of tools that are available to better assist personnel in dealing with hazardous materials attributed to radioactive materials. Because radioactive materials emanate no order, provide no sounds, and are invisible to the naked eye, special tools or devices have been developed to meet the challenges facing responders in detecting and identifying radioactive materials.

Many devices often entail small, handheld devices that comprise survey meters often referred to as radioisotope identification devices, known simply as RIID. Although such meters are effective in measuring or detecting gamma wave radiation, such devices are designed for a single purpose, and is typically held in a responder's hand during use. The responders typically hold RIID devices in one hand when surveying objects with the device, and as such, come in close proximity to surveyed objects in order to effectively determine whether hazardous materials are present. In doing so, responders bear the risk of exposing their hands to radioactive or chemical substances in the process as a result of being in close distance to target objects. The effort is exacerbated as responders often find themselves working in uncomfortable, awkward positions or places, maneuvering between objects, or searching in confined areas resulting in workers straining muscles, becoming imbalanced, and coming into contact with the hazardous materials tested. Prior art devices developed to assist responders in dealing with hazardous materials are generally designed for a single purpose. Also, such prior art devices do not offer the ability for responders to interchange different surveying tools or tactical accessories when on job sites, while at the same time, providing a tool for holding field survey instruments and eliminating the need of holding field survey instruments in hand. Further, prior art devices do not provide a tool for use in hazmat applications that allow responders to take distant measurements of surveyed objects and coordinate the measured data for evidentiary proceedings.

Accordingly, there is an established need for a solution to at least one of the aforementioned problems. There remains a need for a device that improves ergonomics by increasing comfort, balance, posture, and safety for responders when surveying targets for hazardous materials, while extending the reach and distance between first responders and hazardous materials to mitigate dangerous proximity to toxic chemicals or radioactive materials. There is also a need for a device that permits first responders to interchange a host of different field survey instruments and tactical accessories on-site to effectively detect, measure, identify, and locate hazardous materials, and to make measurements of surveyed objects for use in evidentiary proceedings, from a safe distance.

SUMMARY OF THE INVENTION

The present invention is directed to a handheld measurement, search and safety device that includes a main frame having a handle, an extendable member that slides outwards from the main frame, and an interchangeable support brace comprising a buttstock to provide a two-handed configuration in which the extendable member is used to survey objects, or a one-handed configuration in which the extendable member is removed and the main frame alone is used to survey objects in confined areas with an arm brace for stability. The handheld measurement, search and safety device includes a plurality of picatinny rails disposed on both the main frame and extendable member to removably mount a variety of different field survey instruments and/or tactical accessories while physically on-site.

A first embodiment provides a handheld measurement, search and safety device comprising: a main frame including a central hollow channel having an open front, a collar assembly at a proximate end of the main frame, a handle extending downwards from the main frame near the proximate end, and at least one mounting rail disposed on an outer surface of the main frame, an extendable member including another central hollow channel having another open front, at least one mounting rail disposed on an outer surface of the extendable member, and a plurality of holes formed through the extendable member and in sequence along a predetermined length of the extendable member, where the extendable member is inserted within the open front of the main frame, an interchangeable brace support comprising either an arm brace or a buttstock including a back opening removably storing a support rod, and a rod opening, the interchangeable brace support being removably attached to the proximate end of the main frame using the collar assembly, a stabilizer removably attachable to the at least one mounting rail on the main frame, and wherein the support rod is removed from the back opening and inserted within the rod opening in the buttstock to position the handheld measurement, search and safety device along a horizontal axis when the buttstock and the stabilizer are attached to the main frame.

In one aspect, the main frame includes a generally rectangular body having four walls integral with each other defining the central hollow channel, and the extendable member includes a generally rectangular body having four walls integral with each other defining the another central hollow channel.

In one aspect, the at least one mounting rail comprises a plurality of mounting rails attached to any of the four walls of the main frame, and to any of the four walls of the extendable member.

In another aspect, the plurality of mounting rails each comprise picatinny rails, at least two of the plurality of mounting rails disposed on the distal end of the extendable member, opposite each other.

In another aspect, the stabilizer comprises any of a bi-pod, or a tri-pod, where the bi-pod or tri-pod are removably attached to one of the mounting rails via, a quick release mount.

In yet another aspect, the plurality of holes are formed in two walls of the generally rectangular body of the extendable member, where each of the plurality of holes are spaced apart a distance of one inch increments.

In another aspect, the handheld measurement, search and safety device includes a variety of field survey instruments or tactical accessories including any of: a tape measure, flashlight, sample collection devices, hooks, claws, clamps, snips, tweezers, needles, pipets, syringes, swabs, loops, socket tools, a host of tools such as screw drivers, four-star screw driver, wrench, mirror, visual contrast plate, laser, rangefinder, camera, video camera, shield, cable, rope, Geiger counter, radiation isotope identification (RID), metal detector, alpha/beta gamma radiation detector, magnet, container, cup, top platform, marking devices, smart phone, transmitter, receiver, transceiver, spectrometer, ultraviolet light, brush, sponge, large swab, or any combination thereof.

In yet another aspect, the handheld measurement, search and safety device further includes a forward cubic instrument mount, a forward cylindrical mount, and a lower instrument mount.

In still another aspect, the buttstock includes a buckle for attaching an adjustable strap.

In another aspect, a forward cylindrical mount is attached at the distal end of the main frame to a picatinny rail, when the extendable member is completely separated from the main frame.

In another aspect, a plurality of indentations are formed sequentially in the body of the handle to accommodate the fingers of a hand while holding the handle.

In another aspect, the arm brace includes resilient members that flex outwards to attach the arm brace on users having larger forearms.

These and other objects, features, and advantages of the present invention will become more readily apparent from the attached drawings and the detailed description of the embodiments, which follow.

BRIEF DESCRIPTION OF THE DRAWINGS

The embodiments of the invention will hereinafter be described in conjunction with the appended drawings provided to illustrate and not to limit the invention, where like designations denote like elements, and in which:

FIGS. 11 and 12 present a partial elevation of one illustrative embodiment of an measurement collar disposed on a main frame of a handheld measurement, search and safety device having an extendable member disposed in different states of extension therefrom, in accordance with the present invention;

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left". "rear". "right". "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed to a handheld measurement, search and safety device including a main frame having an ergonomic handle, an extendable member removably coupled to the main frame for mounting a variety of tactical accessories, a plurality of picatinny rails provided on the main frame, and field survey instruments for surveying people or objects, and an interchangeable support brace including an arm brace and a buttstock for handling the device with one or two hands during use.

Figure 1:
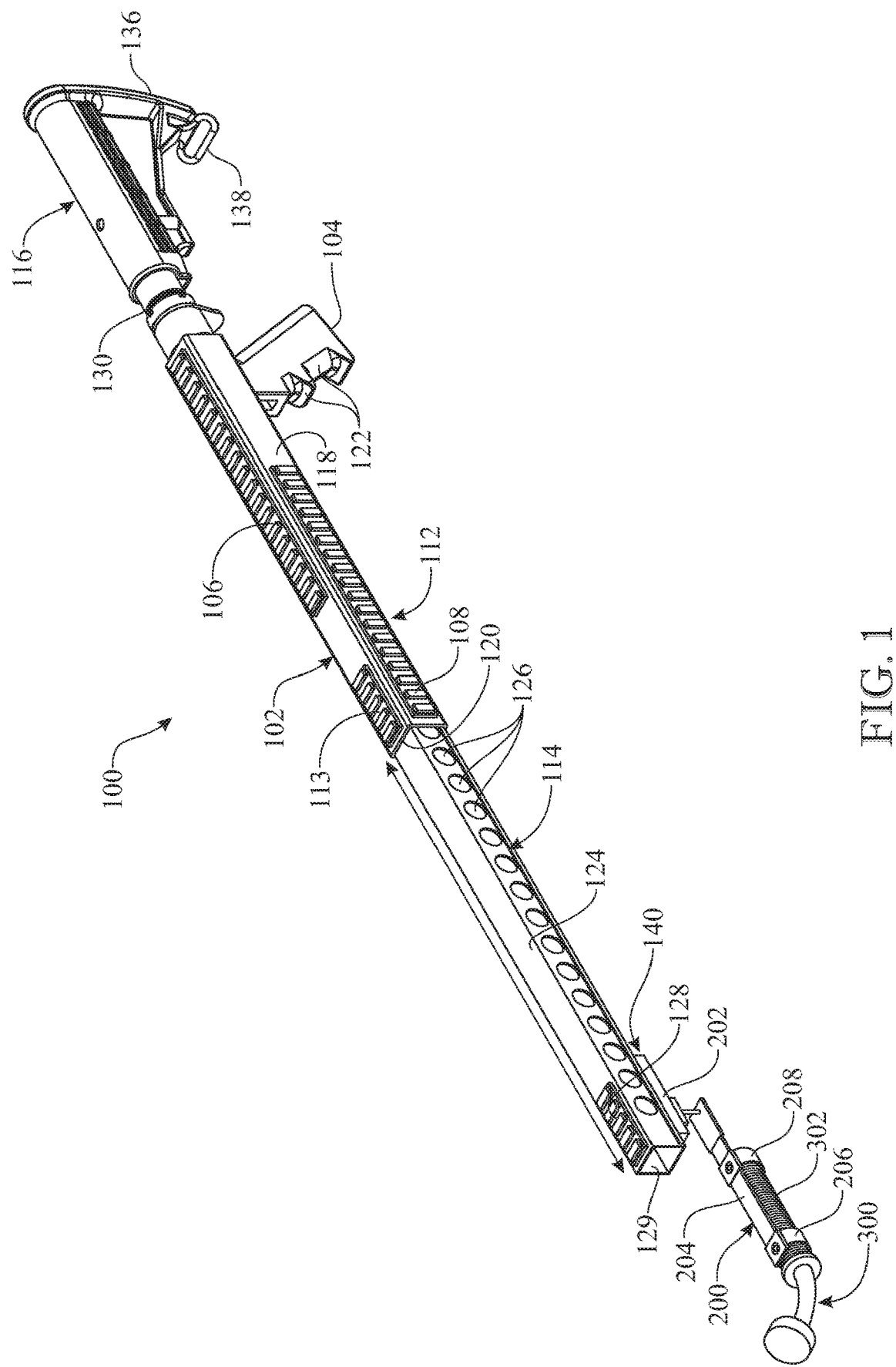
FIG. 1 presents a left side perspective view of a handheld measurement, search and safety device showing a main frame including a handle and picatinny rails, an extendable member, a cylindrical instrument mount removably attached to a picatinny rail on a distal end of the extendable member for holding a field instrument, and an interchangeable support brace including a buttstock to provide a two-handed configuration, in accordance with one embodiment of the present invention.
Figure 2:
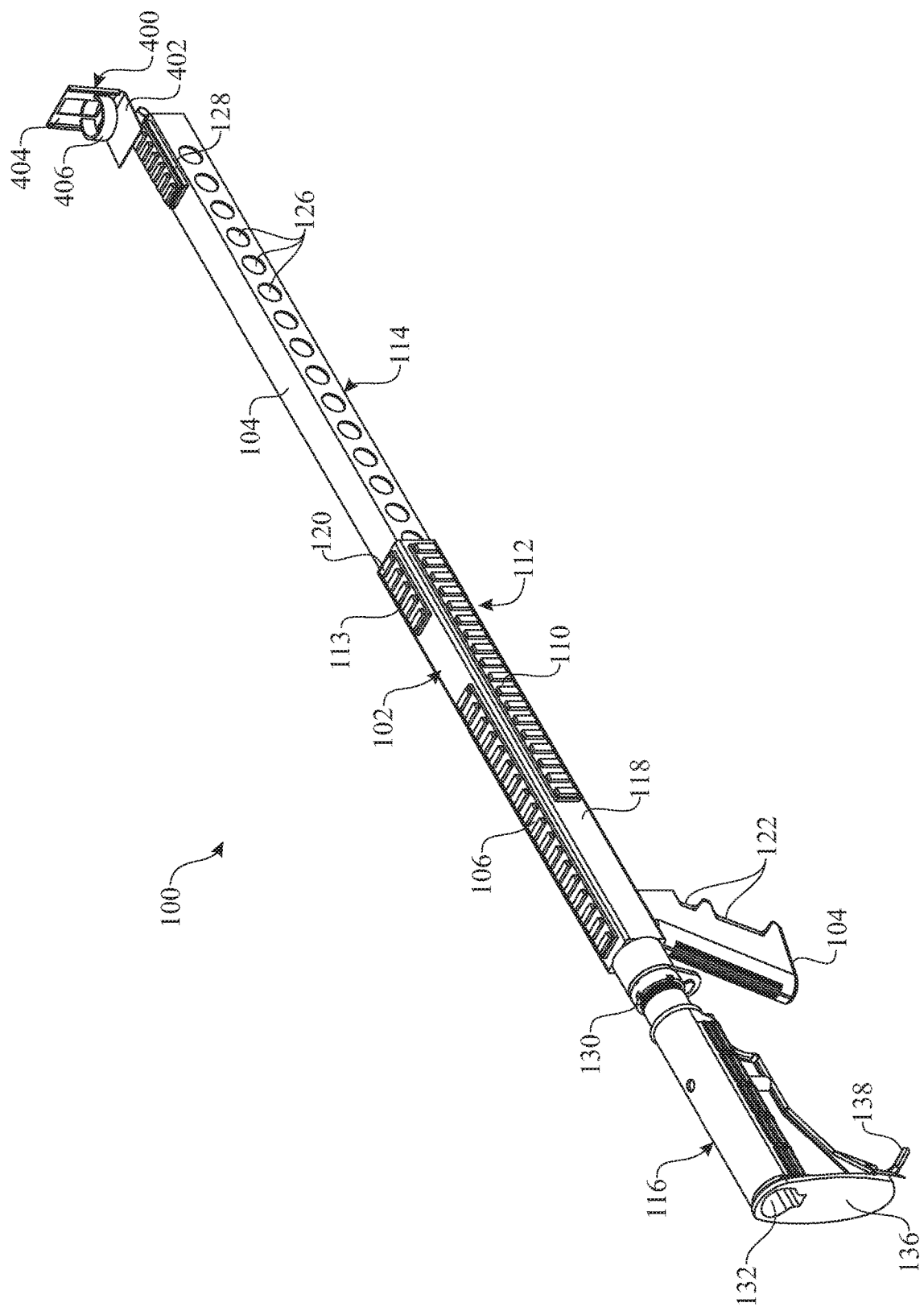
FIG. 2 presents a right side perspective view of the handheld measurement, search and safety device showing a cubic instrument mount removably attached to a picatinny rail on a distal end of the extendable member.

Referring now to the figures wherein like numerals are represented by like elements throughout, there are shown in FIGS. 1 and 2, left and a right perspective view, respectively, of a handheld measurement, search and safety device 100, in accordance with an embodiment of the present invention. The handheld measurement, search and safety device includes a durable main frame 102 having a handle 104 that extends downwards from a lower bottom surface of the main frame 102. At least one accessory mounting rail is provided for mounting a variety of field survey instruments (as defined below) or tactical accessories, and in at least one embodiment, a plurality of accessory mounting rails, such as picatinny rails 106, 108, 110, 112, 113 for mounting a variety of field survey instruments or tactical accessories, an extendable member 114 extending outwards from the main frame 102, and an interchangeable support brace, that in one embodiment, includes a buttstock 116. The main frame 102 generally comprises an elongate, rectangular body 118 having a predetermined length and comprising four walls that are integrally joined together to form an elongate channel 120 that extends a predetermined length within the rectangular body 118. Each picatinny rail 106, 108, 110, 112, 113 comprises any one of a number of lengths, and is permanently, or temporarily affixed to any surface of the four walls of the rectangular member 118. Each picatinny rail 106, 108, 110, 112, 113 may extend the full length, or a partial length of the rectangular body 118. The particular layout of each picatinny rail may differ and as such, in one non-limiting embodiment, a series of shorter picatinny rails 106, 108, 110, 112, 113 may be employed and attached to any or all of the four walls of the rectangular member 118 of the main frame 102 where each picatinny rail is aligned in spaced apart sequence from each other, as shown in FIGS. 1 and 2. Exemplary embodiments of mounting rails include picatinny rails, however, it will be understood that other accessory mounting rails may be employed, including, but not limited to, rails known as weaver, keymod, and M-LOK®. It will also be appreciated that any combination of rails can be used on the main frame 102, extendable member 114, or both. As such, a combination use of picatinny rails and weaver rails may be employed, or M-LOK® rails and picatinny rails as another example may be implemented without departing from the scope of the invention.

A handle 104 is permanently or adjustably attached near the proximate end of the main frame 102 to accommodate holding the handheld measurement, search and safety device 100 in hand, and in at least one embodiment, the handle comprises an ergonomic configuration. As shown, the handle 104 includes a series of indentations 122 that are provided within the body of the handle 104 to conform to the phalange regions of a user's fingers to enhance comfort and provide firm gripping when holding the handle 104 during use. The handle 104 may be integrally formed with, or over-molded on, the body of the main frame 102, or separately attached directly to the body of the main frame 102. Alternatively, the handle 104 can be mounted onto a picatinny rail, via a quick release mount, where the picatinny rail is disposed on the lower, bottom surface of the main frame 102. The handle 102 may be covered or coated with, a durable rubber, foam, or polymer material, and include frictional properties such as dimples, grooves, ridges, or protrusions that are formed or provided on the outer surface of the handle 104 to prevent the handle 104 from slipping in a person's hand when navigating with the handheld measurement, search and safety device 100. It is understood that a forehand handle (not shown) may be removably mounted to the picatinny rail 112 to further accommodate a two-handle configuration in which users grasp both handles with both hands when maneuvering the handheld measurement, search and safety device 100 with the extendable member 114 in use. The added forehand handle may provide a beneficial feature when employing a buttstock 116.

With continued reference to FIGS. 1 and 2, the extendable member 114 adjustably slides within the extended channel 120 and along the longitudinal axis of the main frame 102, as denoted by the bi-directional arrow shown along the extendable member 114. In one non-limiting embodiment, the extendable member 114 comprises a generally rectangular body 124 having four walls that are integrally joined together and conforming similar in geometrical shape to the rectangular body 118 of the main frame 102. The dimensional construction of the extendable member 114 is slightly smaller in size to permit sliding movement of the extendable member 114 within the extended channel 120 of the main frame 102. In one non-limiting embodiment, the extendable member 114 is adjustably locked within the channel 120 in fixed, incremental, extended positions by means of a locking mechanism that is coupled to the main frame 102. In one embodiment, the locking mechanism comprises a rotating screw, or cam-style lever lock that is employed to adjustably secure the extendable member 114 in adjustable position within the channel 120 of the main frame 102.

In accordance with at least one embodiment of the present invention, an elongated member 114 comprises a plurality of measurement indices which permit a user to quickly and easily determine an extended length of the device 100. As used herein, an extended length may be either an overall length of the device 100 from end to end, or a length from a fixed location on the device 100 to a particular filed survey instrument or tactical accessory operatively mounted to the device 100. In one embodiment of a handheld measurement, search and safety device 100, a plurality of measurement indices comprise a series of holes 126 formed through one or more walls of the rectangular body 124 and disposed in sequence along a predetermined length of the extendable member 114. The holes 126 are formed to reduce the weight of the handheld measurement, search and safety device 100 thus making it easier and more agile for personnel to maneuver and navigate the device 100 during use. The plurality of holes 126 are also employed for the intended purposes of distance measurement applications in the field. The plurality of holes 126 are positioned a predetermined distance apart from each other, at one-inch-on-center increments, to serve as position indicators, transforming the extendable member 114 into a measuring bar when extended. A one-inch-on-center may be represented as one hole equals one click equals one inch. The measurement configuration is intended to provide an easy and quick indication for even the least trained responder to understand and apply when working on a job site. The present embodiment is not limited to formation or use of the plurality of holes 126 and as such, as in one alternative embodiment, the extendable member 114 may comprise a solid or hollow rectangular body 124 without holes 126. It may be beneficial for the handheld measurement, search and safety device 100 to include measurement indicators to further pronounce identification of measurements in conjunction with the holes 106. As such, a series of measurement indicators may be imparted on the body 124 of the extendable member 114. Such measurement indicators may comprise, for example, marks, lines, symbols, or indicia that is formed within, or attached separately to, the outer surface of the elongate member 114 at designated locations adjacent each hole 106. A sequence of marks or lines may denote measurements in, millimeters, centimeters, inches, or fractions of inches. Also, although the extendable member 114 is illustrated as being a single piece, it is appreciated that the extendable member 114 may comprise a series of individual pieces, each having a rectangular body in which the rectangular pieces are dimensioned to individually slide one inside the other to provide for a telescoping extendable member 114 where the individual telescoping pieces are releasably locked in various positions or lengths from the main frame 102.

Figure 5:
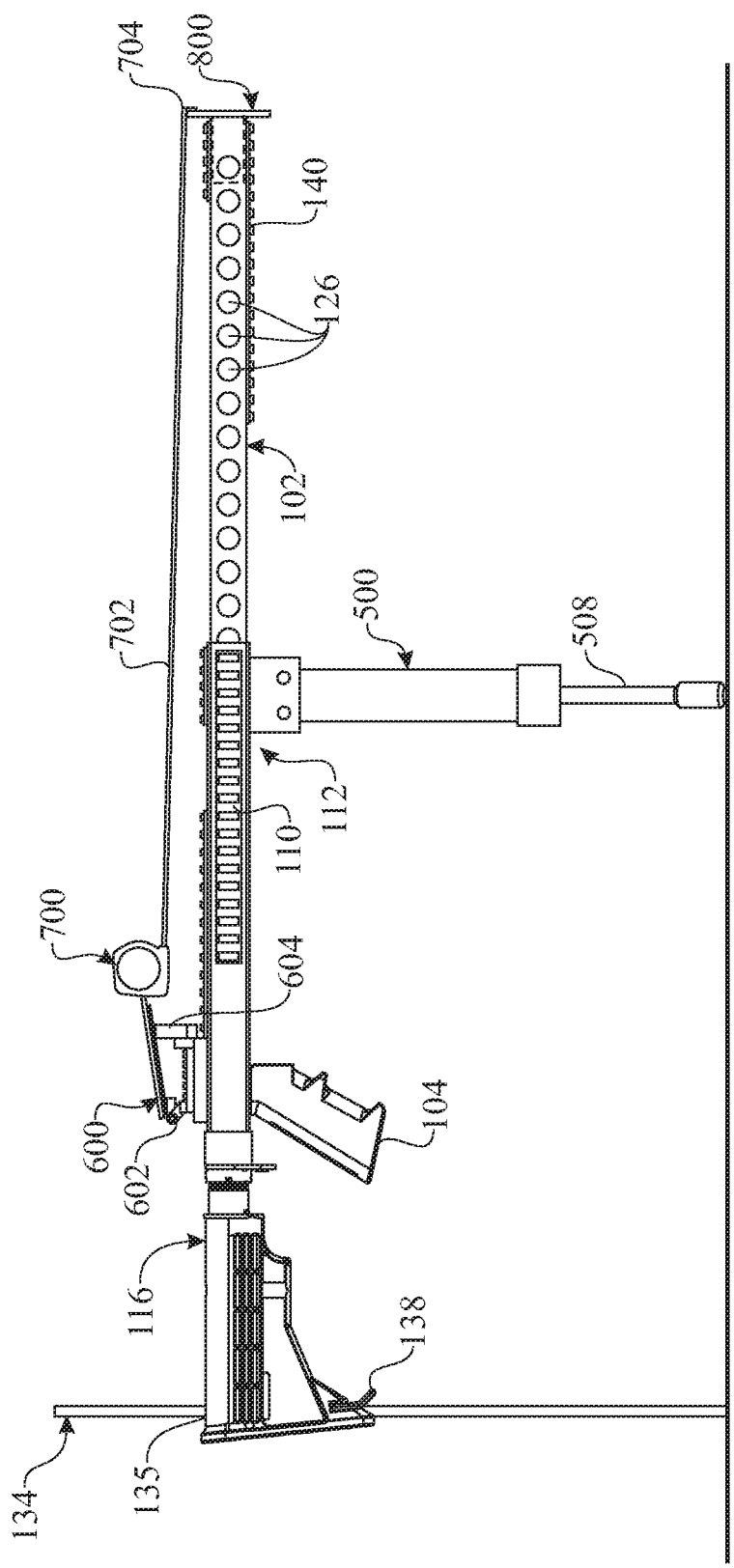
FIG. 5 presents a side elevation of the handheld measurement, search and safety device of FIG. 4 showing the bi-pod and bi-pod rod stabilizing the device along a horizontal axis, and a distance measurement system including a measuring tape line mounted on the peripheral edge of the top platform with a tape line extended forward and attached to a visual contrast plate removably attached to front end of the extendable member.

In one embodiment, the extendable member 114 includes any number of picatinny rails 128, 140 that are provided for example, at the distal end of the body 124, either on the top surface as show in FIG. 1, or on the lower bottom surface, opposite the top surface, as shown in FIG. 5. The picatinny rails 128, 140 are also provided to removably attach any number of field instruments or tactical accessories, such as, via quick release mounts. It is mentioned also that the rectangular configuration of the body 124 of the extendable member 114 defines a front opening 129 to removably receive a visual contrast plate 800 as is exemplified and described further in relation to FIG. 5.

In one embodiment, the handheld measurement, search and safety device 100 includes an interchangeable support brace that gives responders a tactical benefit of using the device 100 when surveying objects, whether in a one-handed or a two-handed configuration, each amendable to particular applications. Utility of the extendable member 114 allows responders to reach out further when surveying or searching people, vehicles, facilities, or terrain with field survey instruments for hazardous materials, but the added weight of the extendable member 114 imposes a need for properly handling the handheld measurement, search and safety device 100 in such situations. For two-handed applications, the handheld measurement, search and safety device 100 includes a buttstock 116 that is mounted to the proximate end of the main frame 102, as illustrated in FIGS. 1 and 2. In one embodiment, the buttstock 116 includes a threaded hub that is removably attached to the proximate end of the main frame 102 via, a locking collar assembly 130. The buttstock 116 includes a back or butt opening 132 (shown in FIG. 2) for inserting and retaining a bi-pod rod 134 (shown in FIG. 4) via a threaded screw and lock nut. The buttstock 116 includes a curved or planar back end 136 adapted to rest against a person's shoulder to steady the handheld measurement, search and safety device 100 during use. It is conceivable for the back end 132 of the buttstock to include a foam or rubber pad or cushion to promote comfort when engaging the buttstock 116 against a user's shoulder.

To assist responders in carrying and transporting the handheld measurement, search and safety device 100, a strap buckle 138 is affixed to the buttstock 116 to permit attaching an adjustable handle strap, or an adjustable shoulder strap (not shown) for securement to a person's shoulder. It will be understood that one or more buckles may be provided anywhere on either the main frame 102 or extendable member 114, or both, to attach one end of an adjustable shoulder strap to the strap buckle 134 and another end to the one or more added buckles. The shoulder strap may comprise any well-known shoulder strap that is typically used with firearms.

A host of handheld field survey instruments, and other tactical accessories, are used, alone or in combination, to perform various functions when detecting, identifying, locating, monitoring, sampling, collecting, transporting or dealing with hazardous materials in the field. For example, there are a number of devices or instruments that are used specifically to survey toxic chemicals, and radioactive materials in potentially dangerous environments. Mounting such handheld field survey instruments, or tactical accessories onto the main frame 102, or extendable member 114, enables trained personnel or responders to gain greater access over distances and eliminate the common practice of surveying dangerous hazmat materials with handheld instruments or accessories. As such, providing a mounting platform for field instruments and tactical accessories increases safety by eliminating the need for individuals to use their hands when holding instruments in close proximity to hazardous materials, and increases distance between the user and radioactive materials that may be present in or on, surveyed objects, people, vehicles, or packages. The handheld measurement, search and safety device 100 helps alleviate the fear of responders exposing their hands to possible danger, or coming in close proximity or in contact with hazardous materials. In practice, a variety of different field survey instruments, or tactical accessories, include but are in no manner limited to: a tape measure, flashlight, sample collection devices, hooks, claws, clamps, snips, tweezers, needles, pipets, syringes, swabs, loops, socket tools, screw drivers, four-star screw driver, wrench, mirror, visual contrast plate, laser, rangefinder, lasers, camera, video camera, shield, cable, rope. Geiger counter, radiation isotope identification and quantification device (RIID), metal detector, alpha/beta gamma radiation detector, magnet, container, cup, marking devices, smart phone, transmitter, receiver, transceiver, spectrometer, ultraviolet light, top platform, brush, sponge, large swab, or any combination thereof.

The handheld measurement, search and safety device 100 provides the ability to easily and quickly mount and interchange any of the field survey instruments, and/or tactical accessories, for use in hazmat applications. One exemplary mount used for employing field survey instrument comprises a cylindrical instrument mount, generally denoted at 200 in FIG. 1. The cylindrical instrument mount 200 is designed to securely hold field survey instruments that may include a handle having a round body. In one exemplary embodiment, the cylindrical instrument mount 200 holds a radioisotope identification device (often referred to as a RIID device) 300 that is employed in the field to measure radioactive alpha/beta gamma rays. The cylindrical instrument mount 200 includes a quick release mount 202 adapted for attaching the cylindrical instrument mount 200 to a picatinny rail 140 provided on the distal end of the extendable member 114, as better seen in FIG. 5. The cylindrical instrument mount 200 includes an extended bracket 204 having a predetermined length, and a pair of clamps 206, 208 that are each attached to the extended bracket 204 and adapted to hold the rounded handle 302 of the RIID 300. Each clamp 206, 208 includes rigid, jaw like members or may include straps having fasteners such as nuts and bolts, or bolts and wing nuts that are used to tighten the jaw like members onto the handle 302 of the RID 300 to securely hold and retain the RIID 300 onto the bracket 200 at the distal end of the extendable member 114. The quick release mount 202 may comprise a releasable-lock mount in which users slide the releasable-lock mount in position along the picatinny rails and rotate a knob to retain the mount in place, or a shift a lever, to lock the mount in position on the picatinny rail. Such mounting brackets are well-known and commonly used with a variety of firearms.

With reference to FIG. 2, a cubic instrument mount 400 is yet another accessory mount used with the handheld measurement, search and safety device 100 that is also designed for holding a variety of different field survey instruments or tactical accessories at the distal end of the extendable member 114. The cubic instrument mount 400 includes a base plate 402 attached to a vertical plate 404 and a holding strap 406 for securely holding and retaining a mounted field instrument in place on the base plate 402. The cubic instrument mount 400 is removably attached to the distal end of the extendable member 114 using a quick release mount designed for use with picatinny rails 106, 108, 110, 112, 113, 126 and 140.

Figure 3:
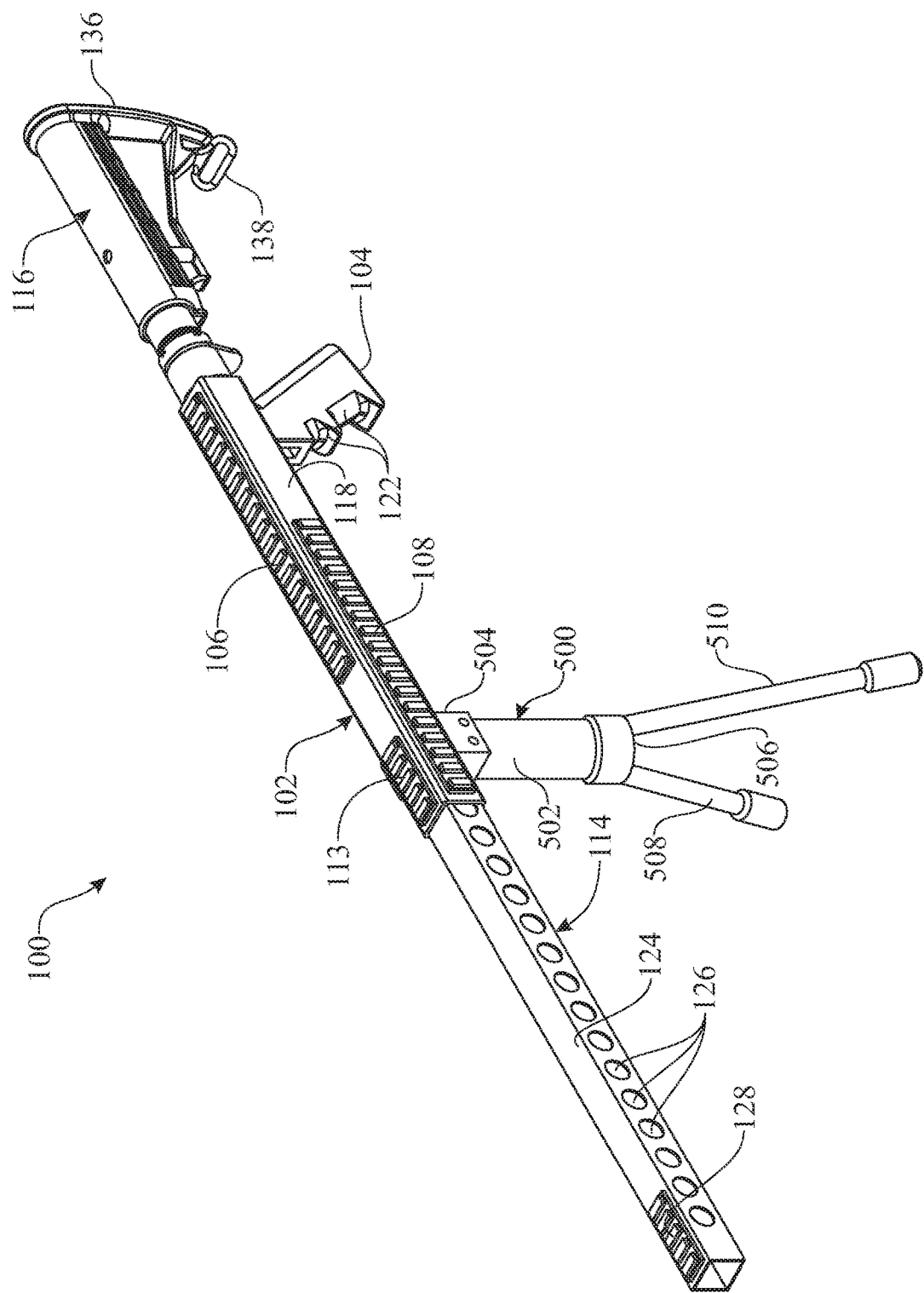
FIG. 3 presents a left side perspective view of the handheld measurement, search and safety device showing a bi-pod mounted to a picatinny rail on the bottom surface of the main frame to retain the handheld measurement, search and safety device in a general horizontal position.

There likely will be situations when trained personnel or responders will assume a prone, kneeling, or laying position when surveying objects in hazmat applications or conditions. The handheld measurement, search and safety device 100 accommodates such positional use by allowing responders to easily, and quickly install a stabilizer, such as a bi-pod 500 to stabilize the handheld measurement, search and safety device 100 in a generally horizontal position. The practical use of the bi-pod 500 is beneficial when using the handheld measurement, search and safety device 100 for distance measurement applications in support of evidentiary materials. As shown in FIG. 3, a bi-pod 500 includes a body 502 equipped with a quick release mount 504 for removably mounting the bi-pod 500 securely to the picatinny rail 112 of the main frame 102. The body 502 includes an inner cavity 506 for storing and extracting legs 508 and 510. Each leg 508, 510 may comprise any length having a round or rectangular body. It is understood that other stabilizers may be implemented for use with the handheld measurement, search and safety device 100 including but not limited to, a tri-pod, or a variety of gun rests that are generally used for firearms. Each leg 508, 510 may include feet, pads, cushions, or the like to further stabilize the horizontal position of the handheld measurement, search and safety device 100, and prevent the device 100 from slipping along a horizontal planar support.

Figure 4:
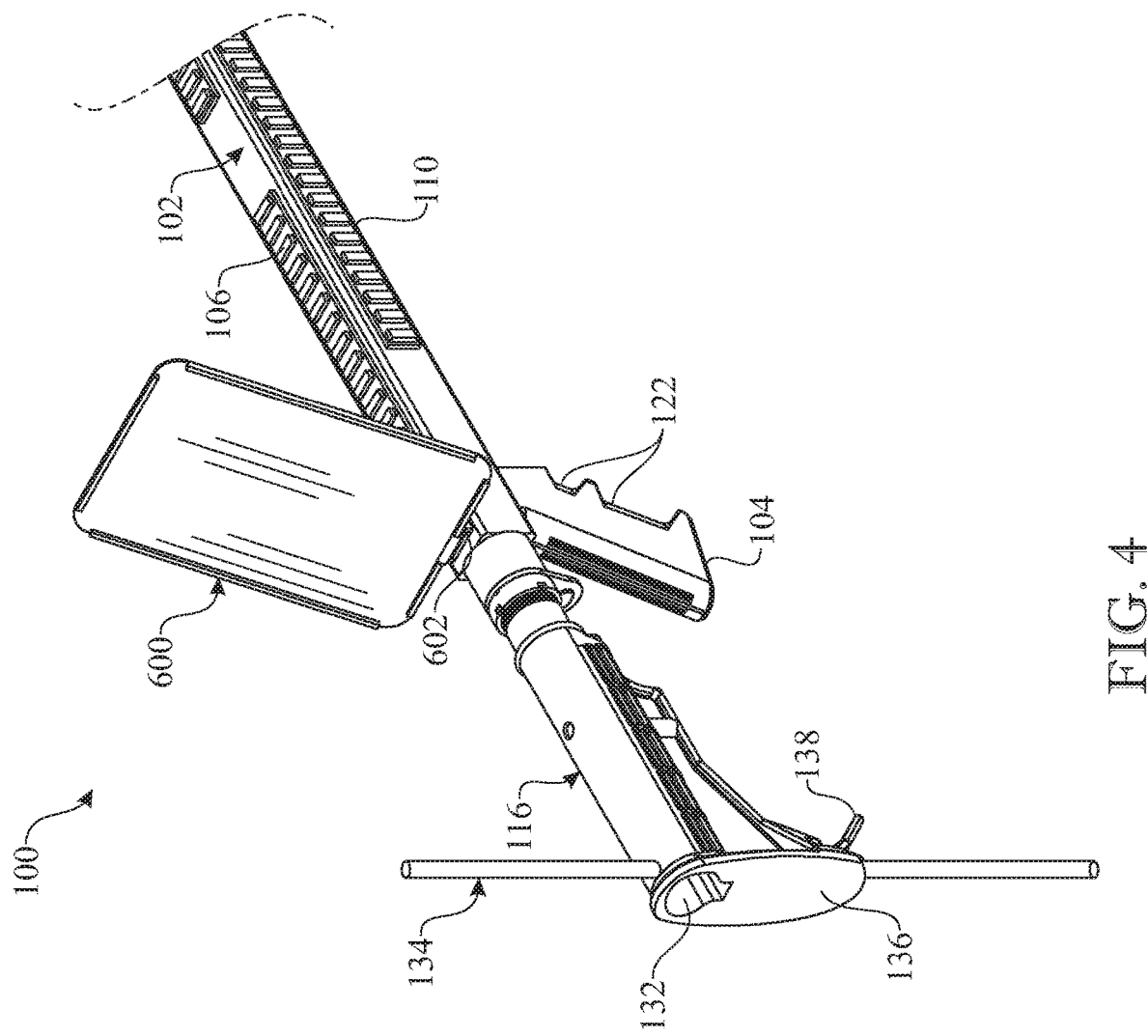
FIG. 4 presents a partial right side perspective view of the handheld measurement, search and safety device showing a top platform pivotally mounted to a picatinny rail on the main frame, and a bi-pod rod removably extending through a rod opening provided in the buttstock for stabilizing the handheld measurement, search and safety device along a horizontally axis on a planar support surface.

Turning now to FIGS. 4 and 5 there are shown a partial right side perspective view, and a side view of the handheld measurement, search and safety device 100 that is oriented horizontally on a planar surface for readily employing the device 100 as a distance measurement system, in accordance with one embodiment of the present invention. The handheld measurement, search and safety device 100 is employed to measure distances between a target object surveyed or investigated and a field instrument such as a RIID that may be provided on a top platform, generally denoted at 600. The top platform 600 includes a platform mount 602 removably attached to a picatinny rail 106 that is provided on the top surface of the main frame 102, above the handle 104. The top platform 600 is dimensionally constructed to securely hold various articles, including but not limited to, an electronic tablet, phone, notebook, regulation sheets, RIID device, or other article. The platform mount 602 may comprise a locking pivot bracket that permits users to easily pivot and position the top platform base in any positional angle atop the main frame 102. The platform mount 602 may include a support post 604 that further supports horizontal positioning and weight bearing of the platform 600 during use. In one embodiment, a frictional material such as rubber, may be provided on the support surface of the top platform 600 to enhance frictional holding, and prevent slippage of, any objects or articles disposed on the platform 600. In one embodiment, a small electronic light may be installed on, or integrally included with, the top platform 600 to allow responders to visually see articles stored on the platform in low lit or dark areas. Also, one or more clamps may be included to hold the articles or objects on the top platform 600. For example, a clamp may be beneficial in retaining sheets of paper on the top platform 600. In another embodiment, the top platform 600 has a conspicuously colored leading front edge, such as a bright fluorescent orange color, that serves as a visual que for photographic evidence.

As shown in FIG. 5, the handheld measurement, search and safety device 100 is readily disposed on a horizontal surface in preparation of taking measurements that may provide evidentiary value in legal proceedings, and that may support analytical diagnostics of hazardous materials. In setting up the distance measuring feature, the bi-pod rod 134 is removed from the back opening 132 by simply unthreading the rod, and the rod 134 is vertically inserted in a designated rod opening 135 formed through the body of the buttstock 116. The bi-pod rod 134 is adjusted within the rod opening 135 to align the buttstock 116 of the handheld measurement, search and safety device 100 along the horizontal axis with the rod 134 remaining in vertical alignment on the planar horizontal surface which may represent the ground, a table, or other top surface of an object. The bi-pod rod 134 may include a threaded screw and nut to securely attach the rod 134 to the buttstock 116 to prevent the rod 134 from sliding freely within the rod opening 135. The bi-pod 500 is attached to picatinny rail 112 with the bi-pod feet 508, 510 spread apart from each other to rest on a planar surface and retain the main frame 102 in horizontal alignment, as illustrated in FIG. 3. A tactical accessory comprising a measuring tape line 700 is removably attached to a peripheral side edge of the top platform 600, and the measuring tape 702 is extracted from the measuring tape line 700 with a measuring tape holder 704 releasably attached to a visual contrast plate 800. The visual contrast plate 800 is removably installed on the front opening 129 of the extendable member 114 using frictional properties. The visual contrast plate 800 includes resilient, spring like tongs that engage the inner sidewalls of the extendable member 114 when inserted into the front opening 129 of the extendable member 114. In one alternative embodiment, the visual contrast plate 704 may include any of a clamp, magnet, clip or other such fasteners to attach the contrast plate 704 to the distal end of the extendable member 114. The visual contrast plate 800 serves to clearly demark the end of the extendable member 114 for photographic clarity, e.g., avoiding a condition of optical parallax. In one non-limiting embodiment, the visual contrast plate 800 comprises a bright fluorescent color such as fluorescent orange or fluorescent red. Both the colored visual contrast plate 800, and the colored leading edge of the top platform 600 function as a strikingly apparent visual que for photographic evidence, which is especially important when photographs are taken from a distance. The colored features help to illustrate disposition, layout, size, distance, and displacement of evidentiary materials.

In one further embodiment, the measuring tape 702 is extracted from the measuring tape line 700 for a measurement distance earmarked as forty inches. More in particular forty inches is an important measurement because it is as close to one meter as emergency field personnel are going to measure in most practical applications. The distance of forty inches is the distance taught in federal first responder training manuals and curricula. Precise distance measurement is critical for spectral analysis of unknown radionuclides and isotopes. Secondary screeners who utilize the handheld measurement, search and safety device 100 measurement system will send data and information to scientists who will analyze gamma spectra of unknown radionuclides/ isotopes in an effort to positively identify the unknown materials surveyed. This process is often referred to as reach-back. Reach-back is typically used for law enforcement purposes, e.g., criminal prosecution. As such, the handheld measurement, search and safety device 100 provides a measurement application tool and system used to help gather and provide forensic evidentiary measurements which is of great value in legal proceedings. The plurality of holes 126 provided in the extendable member 114 assist in making and determining such measurements as they are, in one embodiment, positioned apart from each other at one-inch-on-center increments and serve as a positive indicator transforming the extendable member 114 into a measuring bar when extended outwards from the main frame 102. As such, the measuring tape line 700 and plurality of holes 126 provided on the extendable member 114, both serve as positive methods of measuring distances in the field. As will be appreciated, a measuring tape line 700 may be incorporated in combination with any embodiment of a handheld measurement, search and safety device 100 in accordance with the present invention.

Figure 6:
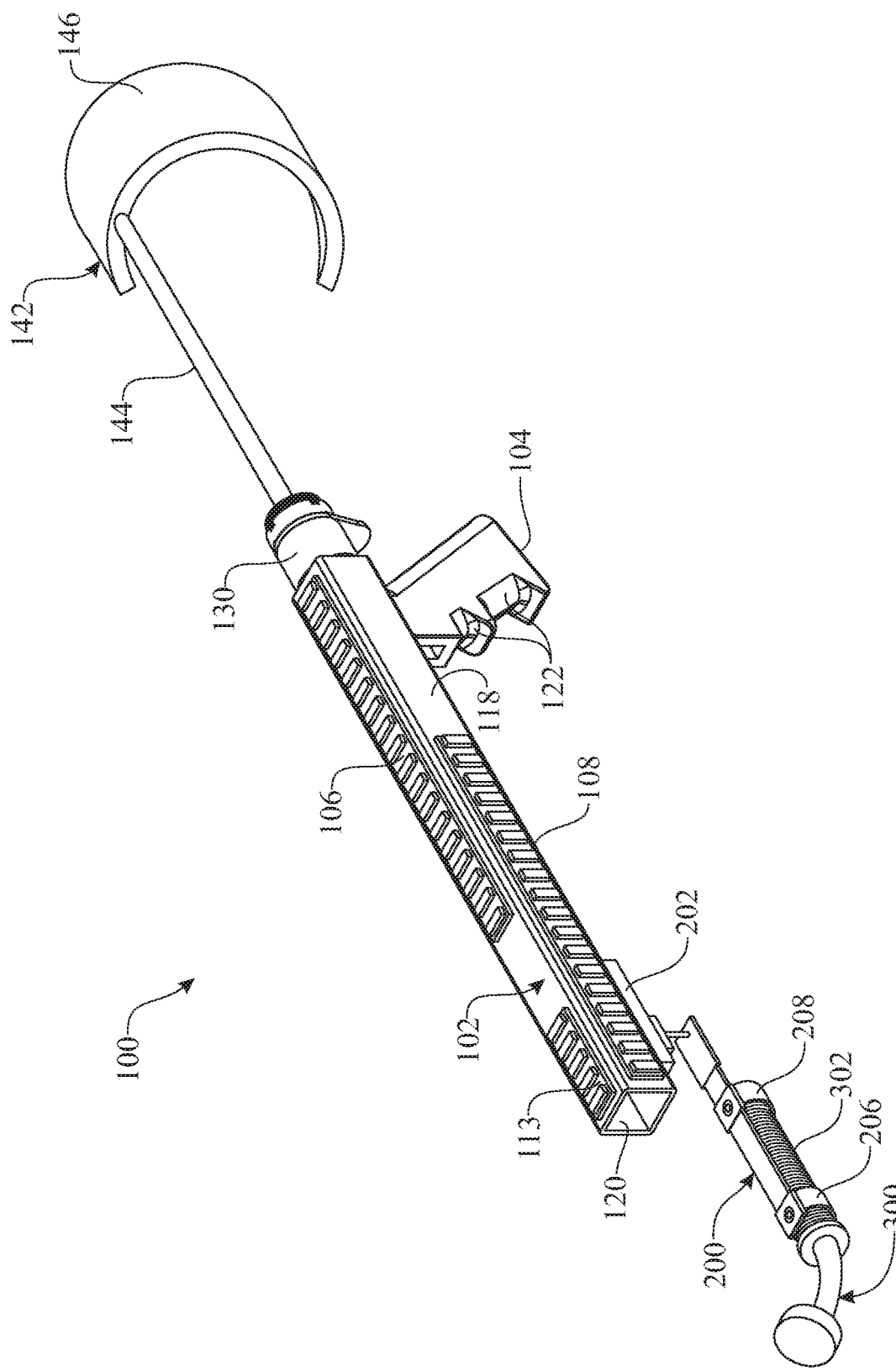
FIG. 6 presents a left side perspective view of the handheld measurement, search and safety device showing an interchangeable support brace comprising an arm brace to provide a one-handed configuration, and the cylindrical instrument mount removably attached to a picatinny rail on a distal end of the main frame after removal of the extendable member.
Figure 7:
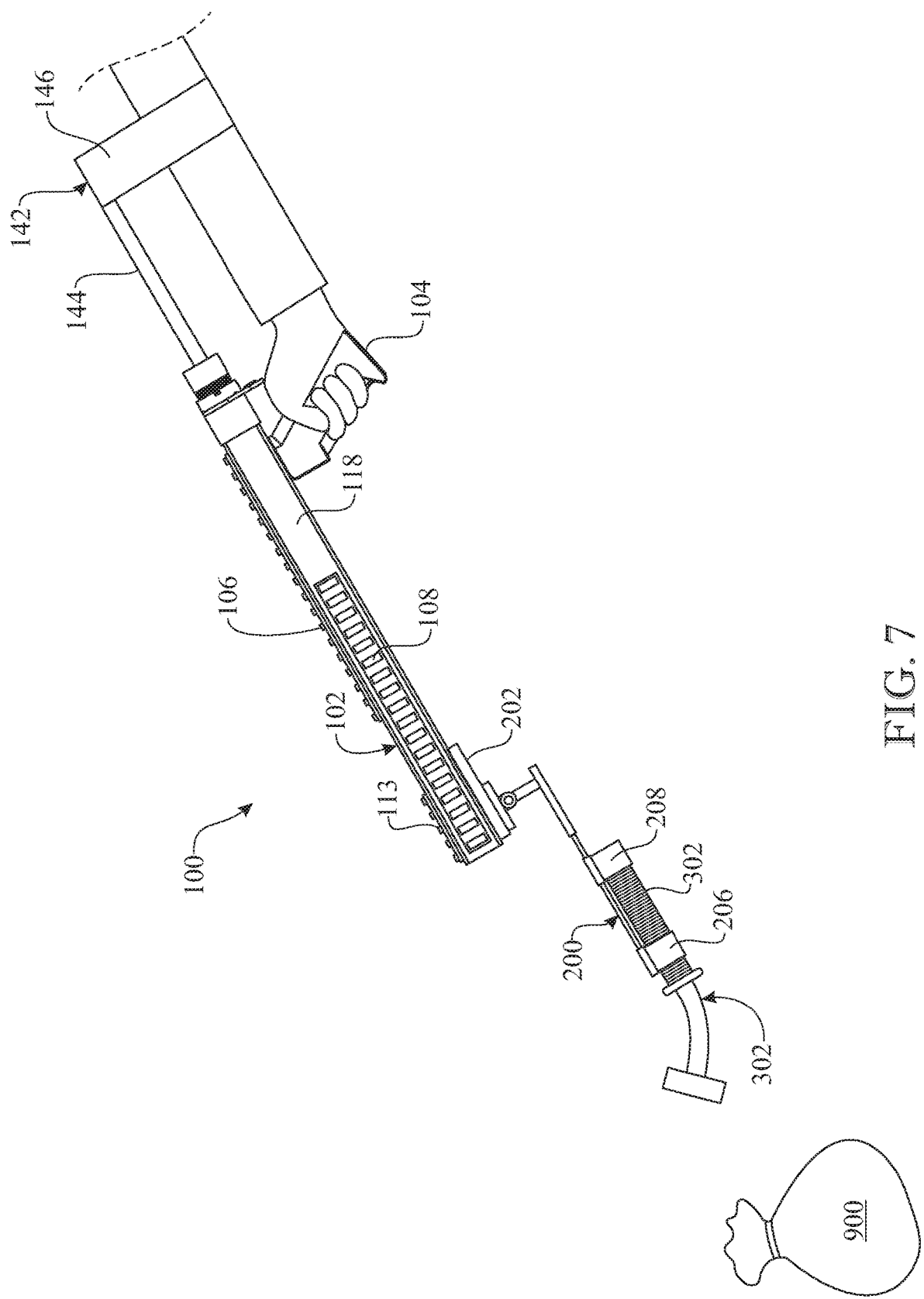
FIG. 7 presents a left side view of the handheld measurement, search and safety device of FIG. 6 showing the arm brace disposed on a user's forearm and the user maneuvering the device in a one handed configuration with the cylindrical instrument mount removably attached to a picatinny rail on a distal end of the main frame and holding a radioisotope identification device that is directed at an object for detecting radioactivity.

With reference now made to FIGS. 6 and 7, the handheld measurement, search and safety device 100 gives responders the tactical advantage of surveying people, packages, or objects for hazardous materials in close, tight rooms, spaces, or quarters where use of the extendable member 114 would hinder such efforts. In achieving this purpose, the handheld measurement, search and safety device 100 is adaptable for use in a one-handed configuration by employing an interchangeable support brace comprising an arm brace 142. In one embodiment, the arm brace 142 includes a brace extension 144 having a predetermined length with one end coupled to a brace body 146, and another end releasably attached to the proximate end of the main frame 102 via a threaded collar assembly 130, as better illustrated in FIG. 6. The brace body 146 includes a generally C-shaped member adapted for easily and quickly installing the brace body 146 onto a person's forearm, as shown in FIG. 7. In one non-limiting embodiment, the brace body 146 may comprise a flexible, plastic material that resiliently expands or flexes outwardly apart to permit mounting the brace body 146 on individuals with larger forearms. It will be noted however, that the brace body 146 may also comprise a fully, enclosed or encircled brace in which responders insert one hand into the hollow region of the enclosed or encircled brace, and then grasp the handle 104 with one hand. It will be understood that the brace extension 144 may comprises any geometric shape such as round, or rectangular, and may also include a telescoping mechanism that allows users to adjust the length of the brace extension 144 during use. It will be understood that any number of brace bodies 146 may be used as well.

The arm brace 142 allows responders to navigate and maneuver the handheld measurement, search and safety device 100 with one hand by easily and quickly positioning the brace body 146 onto the person's forearm while grasping and holding the handle 104 in one hand, with the phalanges of the fingers disposed securely within the finger recesses 122 provided within the handle 104, as illustrated in FIG. 7. In using one hand, first responders can easily and quickly survey objects, denoted for illustrative purposes as a bag 900, with a field survey device such as a radioisotope identification device (RIID) 300 to measure, detect or identify different forms of radiation including alpha and/or gamma radiation materials that may be present in the bag 900. The bag 900, for example, may be situated within a small, confined room, area, or space that would make use of the extendable member 114 impractical or simply not possible. As such, the interchangeable support brace includes a buttstock 116 where responders use a two-handed configuration to navigate the handheld measurement, search and safety device 100 having a longer extendable member 114 for surveying objects or vehicles at larger distances away, or an arm brace 142 where responders can switch quickly and easily to a one-handed configuration to survey objects or people at shorter distances and within smaller, confined areas without the use of the extendable member 114. The brace body 146 may include foam or rubber padding or cushion to enhance comfort and to lessen pressured impact of the brace against a user's arm during use. It is contemplated that to further steady the handheld measurement, search and safety device 100 against a responder's forearm during use, the arm brace 142 may include a short, adjustable strap (not shown) used to attach the brace body 146 to a user's forearm. The short, adjustable strap may extend between opposite, lateral edges of the brace body 146, and include buttons, buckles, hook and loop type fasteners, rings, magnets, or other fasteners for attaching the strap in place.

Figure 8:
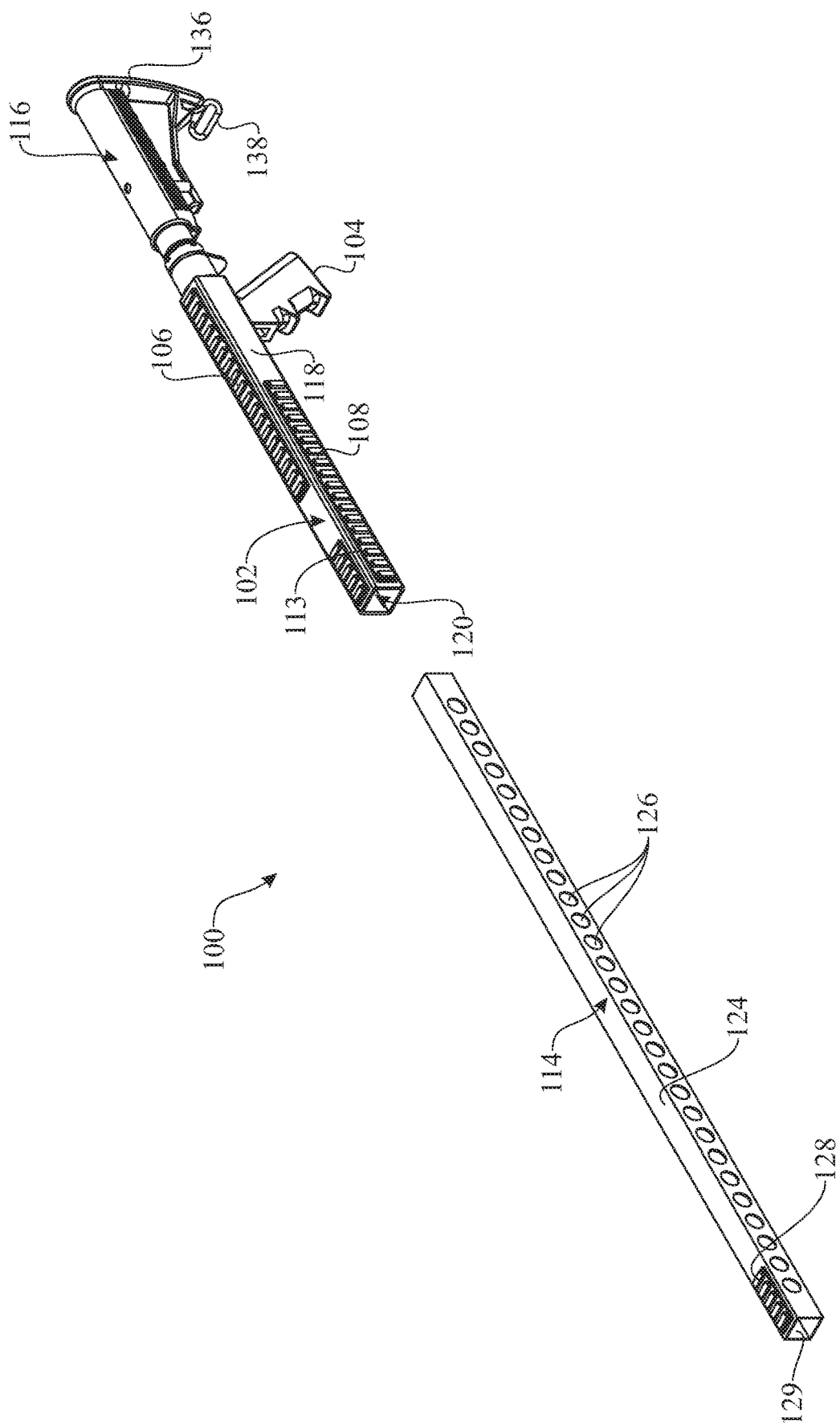
FIG. 8 presents an exploded left side perspective view of the handheld measurement, search and safety device showing the extendable member detachably separated from the main frame.

With reference made to FIG. 8, the handheld measurement, search and safety device 100 can be easily disassembled for carrying and transporting the device 100 from place to place, or for repair or replacement of parts if needed. The extendable member 114 is fully extracted and removed from the central channel 120 of the main frame 102. The buttstock 116 is also detachable and removed from the proximate end of the main frame 102 by decoupling the mechanical connection by rotating the collar assembly 130, as shown in FIG. 1. In embodiments where the handle 104 is removably attached to the main frame 102 using a quick release mount, such a handle 104 could also be removed if desired. A storage container or pouch (not shown) is used to store the separate pieces of the handheld measurement, search and safety device 100, along with certain field survey instruments and/or tactical accessories therein. For example, a rigid storage container may include earmarked or designated recesses to removably insert individual pieces of the handheld measurement, search and safety device 100, and certain field survey instruments or tactical accessories. The storage container may include a handle to allow responders to easily carry and transport the handheld measurement, search and safety device 100 and field survey instruments or tactical accessories from place to place.

A host of different tactical accessories are compatible for use with the handheld measurement, search and safety device 100 as well. For example, trained personnel may have to survey objects, vehicles, or terrain in low lit or dark areas. To overcome this challenge, responders can easily mount a flashlight anywhere on either or both the extendable member 114, or main frame 102, via, picatinny rails 128, 140, 106, 108, 110, 112, 113, 128 and 140 to illuminate the forward direction of trained users and effectively illuminate any surveyed object, person, or target. Still, other applications may require responders to take pictures, determine distances afar, take samples, or check under vehicles for example. In doing so, responders may mount a camera, rangefinder, grippers, and a mirror to the handheld measurement, search and safety device 100 via, any of the picatinny rails provided on either or both the elongate member 114 or main frame 102 giving responders optimum tools needed in hazmat applications. Any combination of tactical accessories and field survey instruments are used with the handheld measurement, search and safety device 100 when surveying objects, people, buildings, vehicles, or terrain for hazardous materials including toxic chemicals, and radioactive materials.

Another important accessory that comports with the main frame 102 is a removable lead shield. In one embodiment, the lead shield comprises a circular shape resembling a common dinner plate. The thickness of the shield may vary based on weight requirements. The standard thickness would be set at ⅛ of an inch. A stiffening backing may be attached to the lead shield to stiffen the pliable nature of the lead material used. Multiple shield plates may be stacked so as to provide additional protection as warranted by calculations. A cut-out will allow each shield to be mounted to the main frame 102 from below by means of a quick release picatinny style connector. The purpose of the cut-out is to allow for direct visual line of sight between the operator and the radiation detector which is mounted at the distal end of the device. The purpose of combining the shield accessory with the radiation detector while the handheld measurement, search and safety device 100 is used in a two-handed configuration is to protect the operator to the greatest degree practicable from ionizing radiation.

It is understood that various modifications or additional features may be made to, or provided with, the handheld measurement, search and safety device 100 without departing from the scope of the invention. For example, it is contemplated that although the main frame 102, and extendable member 114 are depicted as each comprising a generally rectangular body 118, 126, the geometrical shape of the main frame 102 and extendable member 114 may each comprise a round, tubular body where an extendable tube member 114 comprises a slightly smaller diameter than a main tube frame 102 to permit the extendable tube member 114 to adjustably slide within the main tube frame 102.

FIGS. 9 through 35 present several alternative illustrative embodiments of a handheld measurement, search and safety device 1000, and an accompanying variety of field survey instruments and tactical accessories, in accordance with the present invention, wherein, once again, like numerals are represented by like elements throughout. To begin, and with reference to the alternative illustrative embodiments of FIGS. 9 and 10, the handheld measurement, search and safety device 1000 includes a durable main frame 1102 having a handle 1104 that extends downwards from a lower bottom surface of the main frame 1102. At least one accessory mounting rail is provided for mounting a variety of field survey instruments (as defined hereinabove) or tactical accessories, and in at least one embodiment, a plurality of accessory mounting rails, such as picatinny rails 1106, 1108, 1110, 1112, 1113 are provided for mounting the variety of field survey instruments or tactical accessories. As before, a handheld measurement, search and safety device 1000 comprises an extendable member 1114 extending outwardly of and away from the main frame 1102. In one embodiment, the handheld measurement, search and safety device 1000 includes an interchangeable support brace, such as, by way of example, a buttstock 1116.

As shown in the figures, the main frame 1102 generally comprises an elongate body 1118 having a predetermined length and comprising a plurality of walls that are integrally joined together to form an elongate channel 1120 that extends a predetermined length within the elongate body 1118. Also as before, each picatinny rail 1106, 1108, 1110, 1112, 1113 comprises any one of a number of lengths, and is permanently, or temporarily affixed to any surface of the four walls of the rectangular member 1118, and may extend the full length, or a partial length of the body 1118. Once again, exemplary embodiments of mounting rails include picatinny rails, however, it will be understood that other accessory mounting rails may be employed, including, but not limited to, weaver, keymod, and M-LOK® rails. It will also be appreciated that any combination of rails can be used on the main frame 1102, extendable member 1114, or both. As such, a combination of picatinny rails and weaver rails may be employed, or M-LOK® rails and picatinny rails as another example may be implemented without departing from the scope and intent of the present invention.

As before, it is well understood that although the main frame 1102 and extendable member 1114 are depicted as each comprising a generally rectangular body 1118, 1124, the geometrical shape of the main frame 1102 and extendable member 1114 may each comprise a round, tubular body where an extendable member 1114 comprises a slightly smaller diameter than a main frame 1102, once again, to permit the extendable member 1114 to be adjustably extended outwardly of and away from the main frame 1102 while in use, and to be retracted back into the channel 1120 of the main frame 1102 when not in use.

As before, a handle 1104 may be either permanently or releasably attached near the proximate end of the main frame 1102 to accommodate holding the handheld measurement, search and safety device 1000 in one's hand, and also as before, in at least one embodiment, the handle 1104 comprises an ergonomic configuration. As shown by way of example in FIG. 9, the handle 1104 includes a grip 1122 to provide a firm supporting section for a user to grasp while holding the handle 1104 during use. The handle 1104 may be integrally formed with, or over-molded onto, the body of the main frame 1102, or separately attached directly to the body of the main frame 1102, such as via a tailpiece 1105 disposed on one end of the main frame 1102, such as is shown in the illustrative embodiment of FIGS. 9 and 10. Alternatively, the handle 1104 can be mounted onto a picatinny rail, via a quick release mount, where the picatinny rail is disposed on the lower, bottom surface of the main frame 1102. Once again, a handle 1104 may be covered or coated with, a durable rubber, foam, or polymer material, and include frictional properties such as dimples, grooves, ridges, or protrusions that are formed or provided on the outer surface of the handle 1104 to prevent the handle 1104 from slipping from a user's hand when navigating with the present handheld measurement, search and safety device 1000. It is understood that a second, forehand handle (not shown) may be removably mounted to the picatinny rail 1112 to further accommodate a two-handle configuration in which users grasp each handles with one hand when maneuvering the handheld measurement, search and safety device 1000 while the extendable member 1114 is in use. The added forehand handle may provide a beneficial feature when employing a buttstock 1116, such as is shown, by way of example, in the alternative illustrative embodiment of FIGS. 14 through 16.

With continued reference to FIGS. 9 and 10, the extendable member 1114 of the present handheld measurement, search and safety device 1000 adjustably slides within the extended channel 1120 and along the longitudinal axis of the main frame 1102, as with the embodiment of the handheld measurement, search and safety device 100 described hereinabove. In one non-limiting embodiment, an extendable member 1114 comprises a body 1124 having a plurality of walls that are integrally joined together and conforming similar in geometrical shape to the body 1118 of the main frame 1102. The dimensional construction of the extendable member 1114 is slightly smaller in size to permit sliding engagement of the extendable member 1114 within the extended channel 1120 of the main frame 1102. In one non-limiting embodiment, the extendable member 1114 is adjustably locked within the channel 1120 in fixed, incremental extended positions by way of a measurement collar 1132, discussed in greater detail hereinafter, coupled to the main frame 1102. In one embodiment, the measurement collar 1132 comprises an extension lock nut 1136 and/or an extension lock pin 1138, employed to adjustably secure the extendable member 1114 in a desired position within the channel 1120 of the main frame 1102. In one further embodiment, such as is shown by way of example in FIGS. 11 and 12, a measurement 1132 collar comprises an extension lock nut 1136 and an extension lock pin 1138 which are employed to adjustably secure the extendable member 1114 in the desired position within the channel 1120 of the main frame 1102.

As before, in accordance with at least one embodiment of the present invention, an elongated member 1114 comprises a plurality of measurement indices which permit a user to quickly and easily determine an extended length of the device 1000. Also as before, as used herein, an extended length may be either an overall length of the device 1000 from end to end, or a length from a fixed location on the device 1000 to a particular filed survey instrument or tactical accessory operatively mounted to the device 1000. In one embodiment of a handheld measurement, search and safety device 1000, a plurality of measurement indices comprise a plurality of marks 1126 formed along at least one side and disposed in sequence along a length of the body 1124 of the extendable member 1114. The marks 1126 are provided to facilitate distance measurement applications in the field. The plurality of marks 1126 are positioned a predetermined interval apart from each other, such as, by way of example only, at one-inch intervals, so as to serve as position indicators, thereby transforming the extendable member 1114 into a measuring bar, when extended forward from or retracted backward into the channel 1120 of the main frame 1102, such as is shown by way of example by the directional arrow in FIG. 12. More in particular, a predetermined interval of one-inch may be at least partially defined by a distance between adjacent ones of the plurality of marks 1114 of one-inch. The measurement configuration is intended to provide a quick and easy visual indication for even the least trained responder to understand and apply when working on a job site.

More in particular, in at least one embodiment, as noted above, the present handheld measurement, search and safety device 1000 comprises a measurement collar 1132 coupled to a main frame 1102. As may be seen from the figures, a measurement collar 1132 includes a measurement display window 1134, wherein at least a portion of an extendable member 1114 disposed in the channel 1120 of the main frame 1102 is visible through the measurement display window 1134. Further, and as before, in at least one embodiment, the extendable member 1114 of the handheld measurement, search and safety device 1000 includes a plurality of marks 1126 disposed along the body 1124 of the extendable member 1114, such as is shown by way of example in FIG. 12. With reference to the illustrative embodiment of FIGS. 11 and 12, the measurement window 1134 of the measurement collar 1132 in accordance with the present invention is utilized to allow a user to readily view one or more of the plurality of marks 1126 disposed on and along at least a portion of the extendable member 1114, so as to provide a user with an indication of the extent to which the extendable member 1114 extends outwardly from and past the end of the main frame 1102. As before, the plurality of marks 1126 denote measurements in, millimeters, centimeters, inches, or fractions of inches, disposed along at least a portion of a length of the extendable member 1114. In at least one further embodiment, numerals accompany one or more of the plurality of marks 1126 to indicate a specific distance by which the extendable member 1114 extends outwardly from and past the end of the main frame 1102, so as to provide the user with a quick and easy indication of the overall extended length of the present handheld measurement, search and safety device 1000 while in the field.

In at least one embodiment, the plurality of marks 1126 are utilized to denote a measurement distance of forty inches. Once again, and as before, forty inches is an important measurement because it is as close to one meter as emergency field personnel are likely able to practically measure in the field in most applications, and, more importantly, a distance of forty inches is the distance taught in federal first responder training manuals and curricula as the minimum safe distance from which certain measurements should be taken. As another example, precise distance measurement is critical for spectral analysis of unknown radionuclides and isotopes. As such, the present handheld measurement, search and safety device 1000 allows a user to gather and provide forensic evidentiary measurements which is of great value in legal proceedings. The plurality of marks 1126 provided on the extendable member 1114 assist in making and determining such measurements as they are, in one embodiment, positioned apart from each other at predetermined intervals, such as, one-inch intervals, and thus serve as a positive indicator transforming the extendable member 1114 into a measuring bar when extended outwards from the main frame 1102. In at least one embodiment, the present handheld measurement, search and safety device 1000 further comprises a tape measuring line 700 which may be utilized in conjunction with the plurality of marks 1126 provided on the extendable member 1114, both serving and confirming positive measurement of distances in the field. As will be appreciated, once again, a measuring tape line 700 may be incorporated in combination with any embodiment of a handheld measurement, search and safety device 1000 in accordance with the present invention.

As before, although the extendable member 1114 is illustrated as being a single piece, it is appreciated that the extendable member 1114 may comprise a series of individual pieces, each having a body dimensioned to individually slide one inside the other to provide for a telescoping extendable member 1114, wherein the individual telescoping pieces are releasably secured in various positions or lengths while extended from the main frame 1102.

Figure 9:
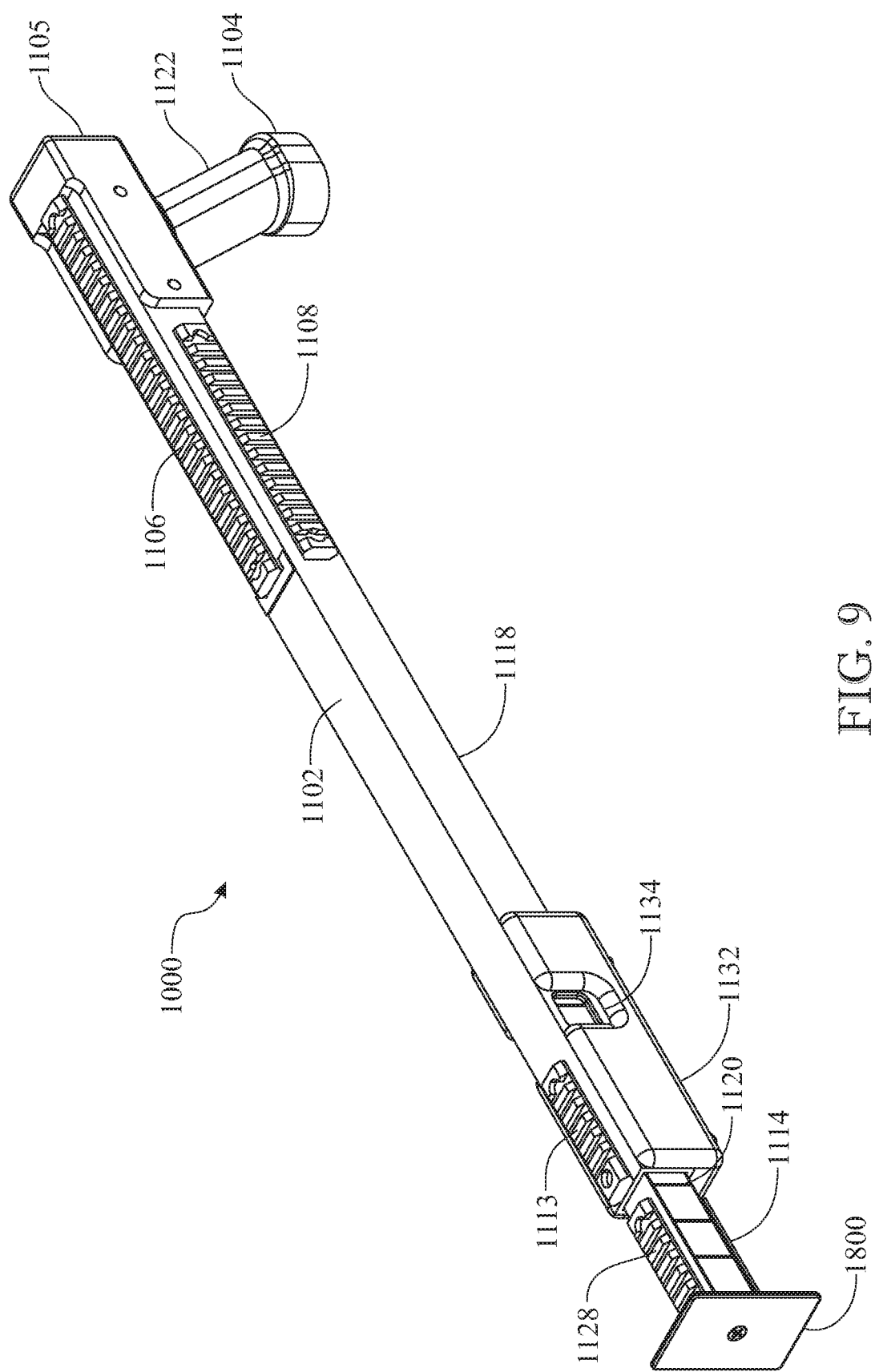
FIG. 9 presents an upper left side perspective view of one alternative illustrative embodiment of a handheld measurement, search and safety device, in accordance with the present invention.
Figure 10:
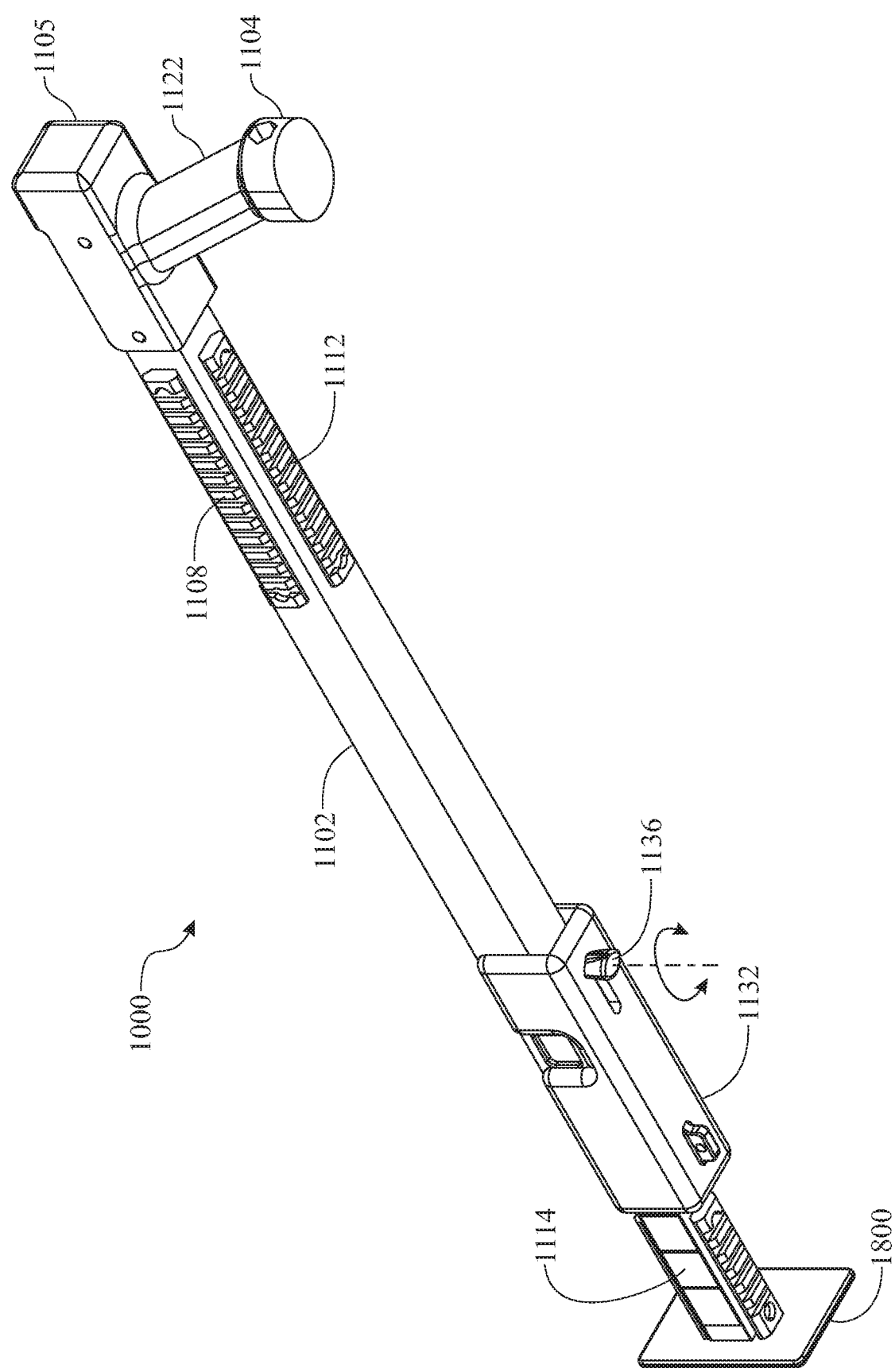
FIG. 10 presents a lower left side perspective view of the alternative embodiment of the handheld measurement, search and safety device of FIG. 9, in accordance with the present invention.

Also as before, in at least one embodiment, the extendable member 1114 includes one or more picatinny rails 1128 provided at the distal end of the body 1124, for example, on the top surface as show in FIG. 9, or on both the top surface and the bottom surface of the body 1124, opposite the top surface, such as is shown in at least FIGS. 11 and 12. As with picatinny rails 1106, 1108, 1110, 1112, 1113 of the main frame 1102, the picatinny rails 1128 are also provided to removably attach any number of field instruments or tactical accessories, such as, via quick release mounts. In at least one embodiment, the extendable member 1114 comprises a front opening 1129, as is shown by way of example in FIG. 34, which is also provided to removably receive any number of field instruments or tactical accessories therein, such as, the visual contrast plate 1800 as is shown best in FIGS. 9 through 12.

Figure 13:
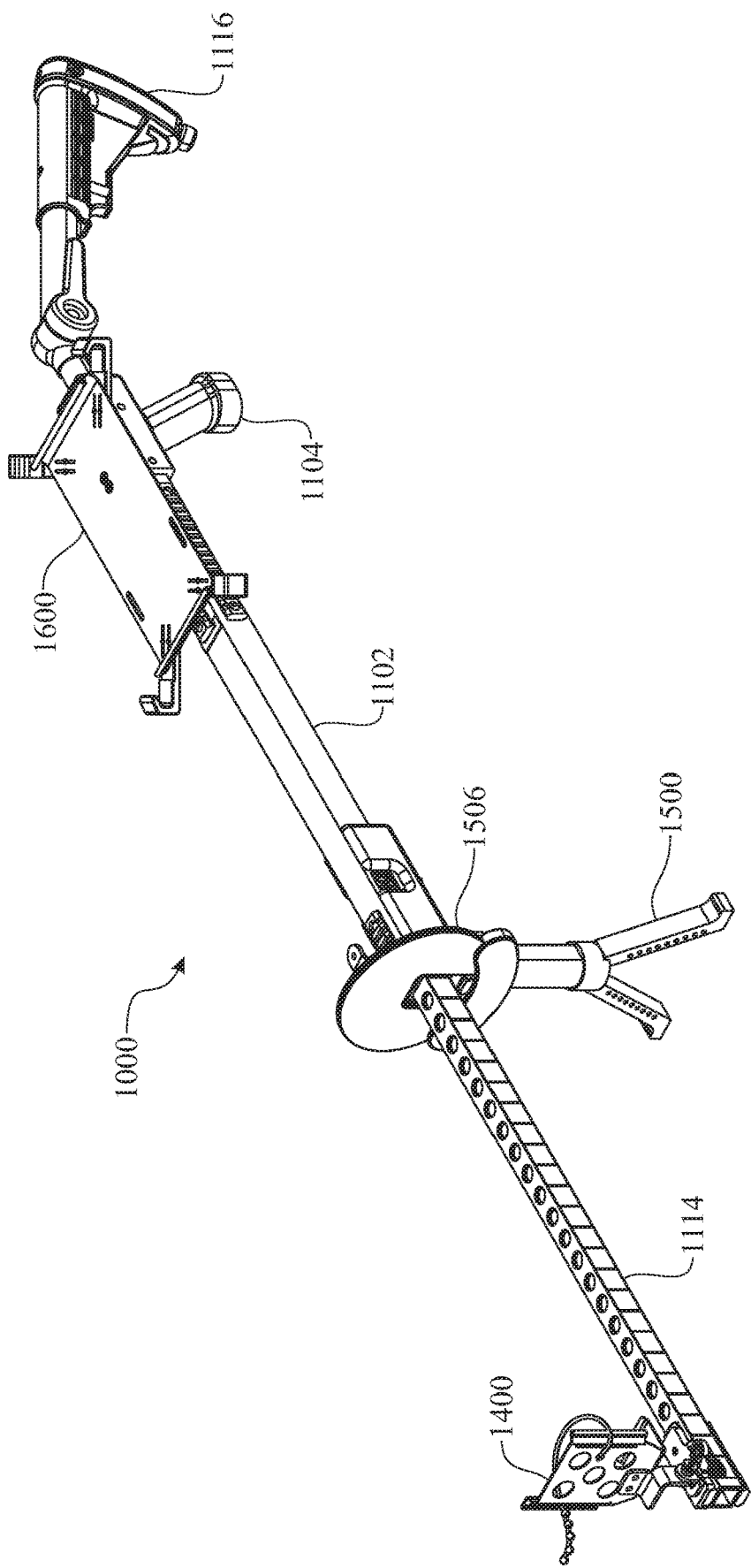
FIG. 13 presents an upper left side perspective view of another alternative illustrative embodiment of a handheld measurement, search and safety device having an instrument mount, a bi-pod and a shield, and a platform mounted thereto, in accordance with the present invention.
Figure 14:
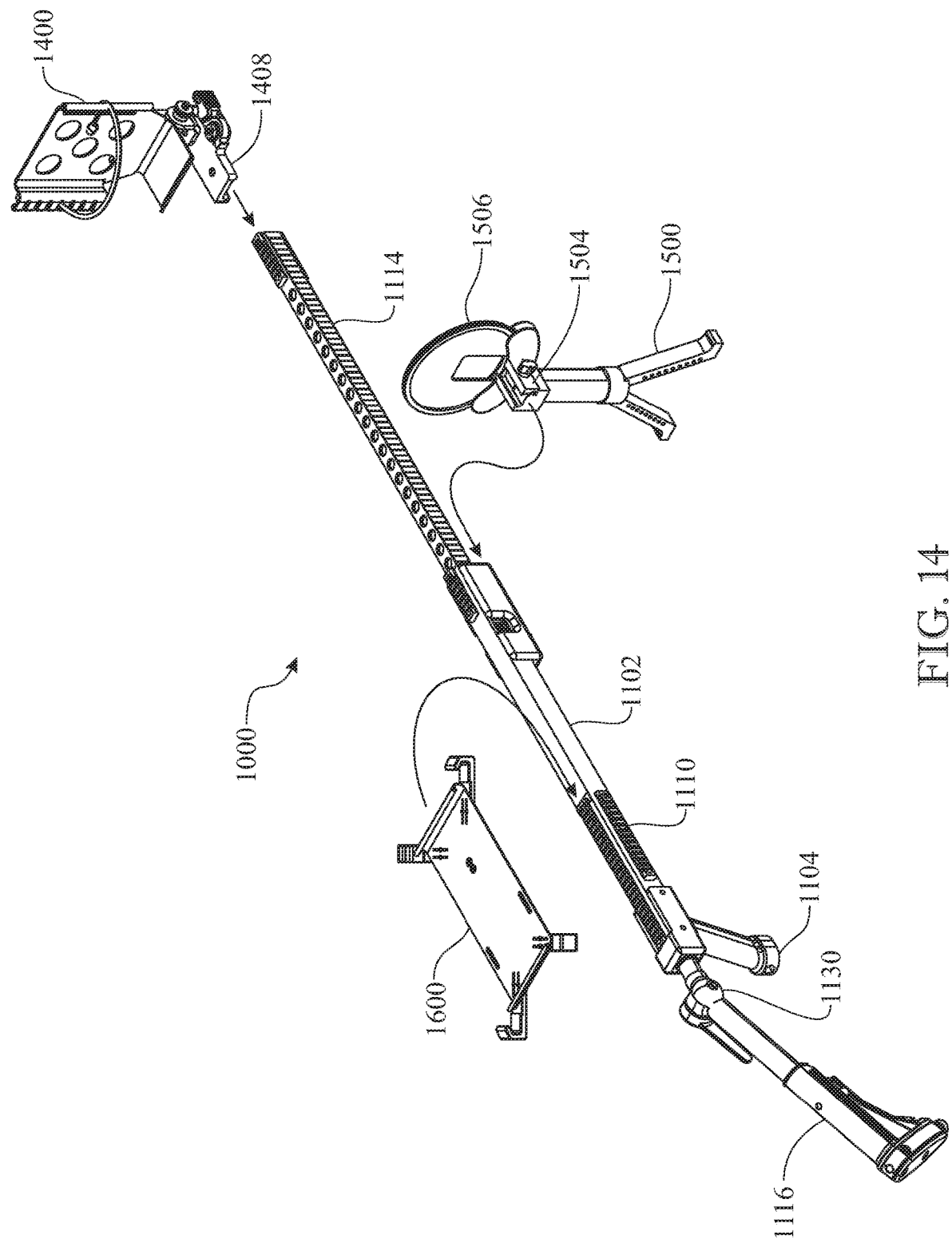
FIG. 14 presents a partially exploded upper right side perspective view of the alternative embodiment of the handheld measurement, search and safety device of FIG. 13 having an instrument mount, a bi-pod, a shield, and a platform, in accordance with the present invention.
Figure 15:
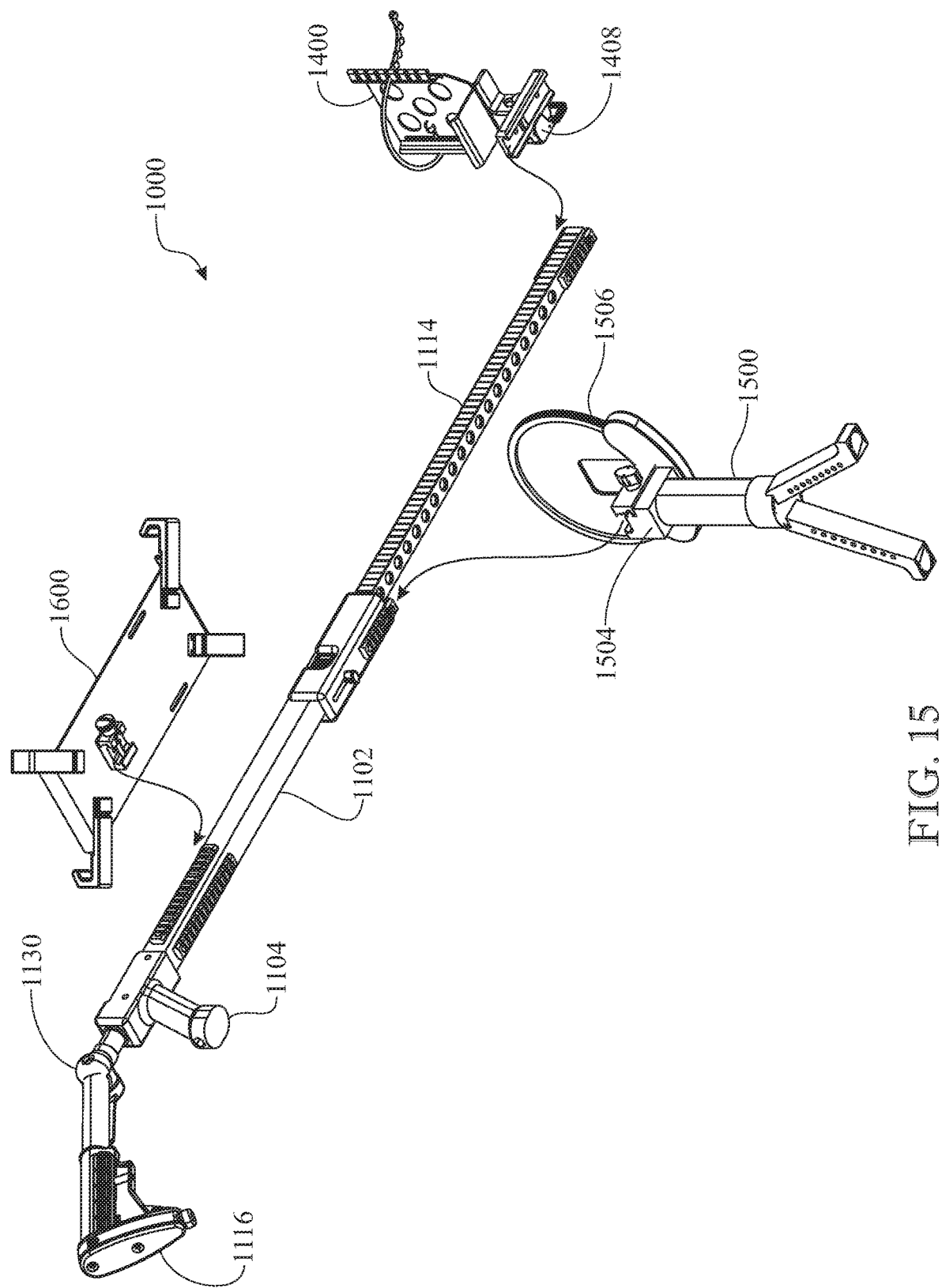
FIG. 15 presents a partially exploded lower right side perspective view of the alternative embodiment of the handheld measurement, search and safety device of FIG. 13 having an instrument mount, a bi-pod, a shield, and a platform, in accordance with the present invention.
Figure 16:
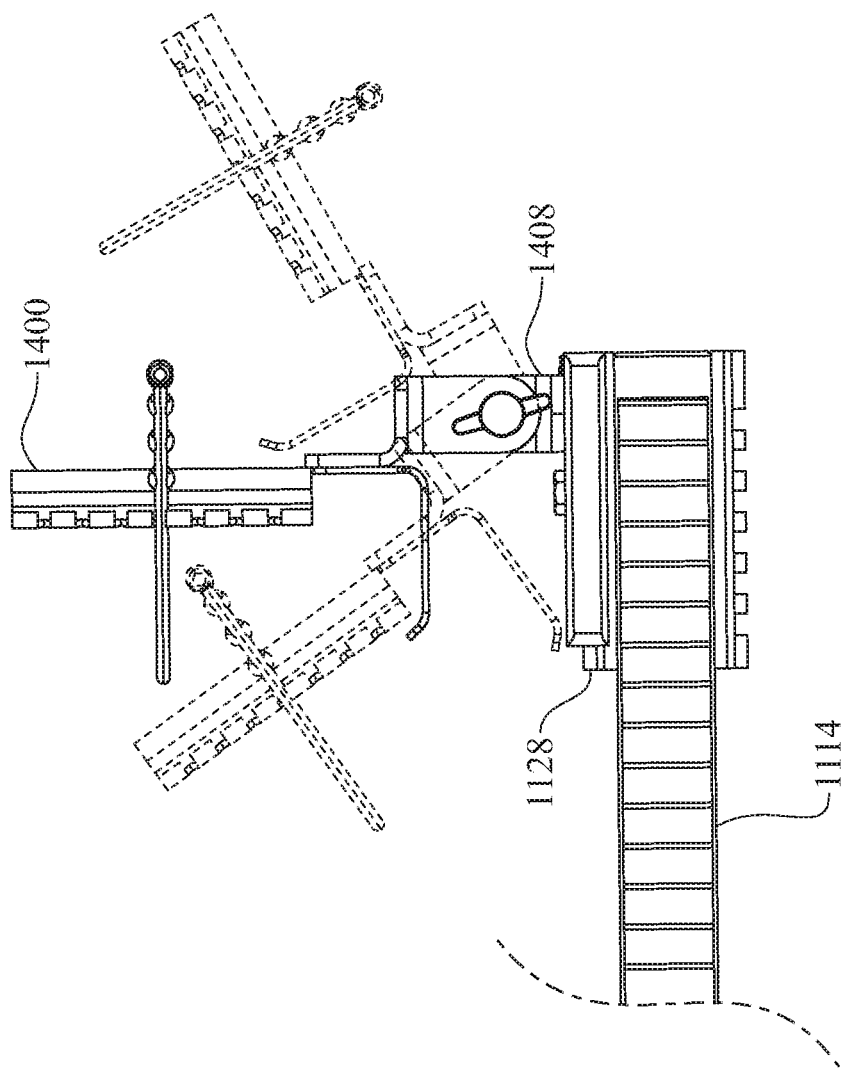
FIGS. 16 through 18 present perspective views of one illustrative embodiment of an instrument mount for use with a handheld measurement, search and safety device, in accordance with the present invention.
Figure 17:
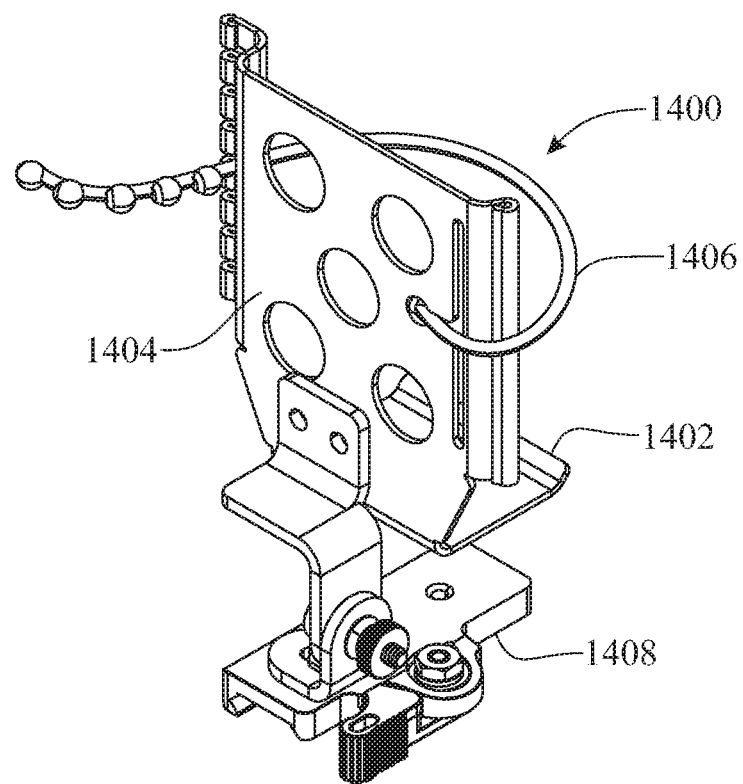
Figure 18:
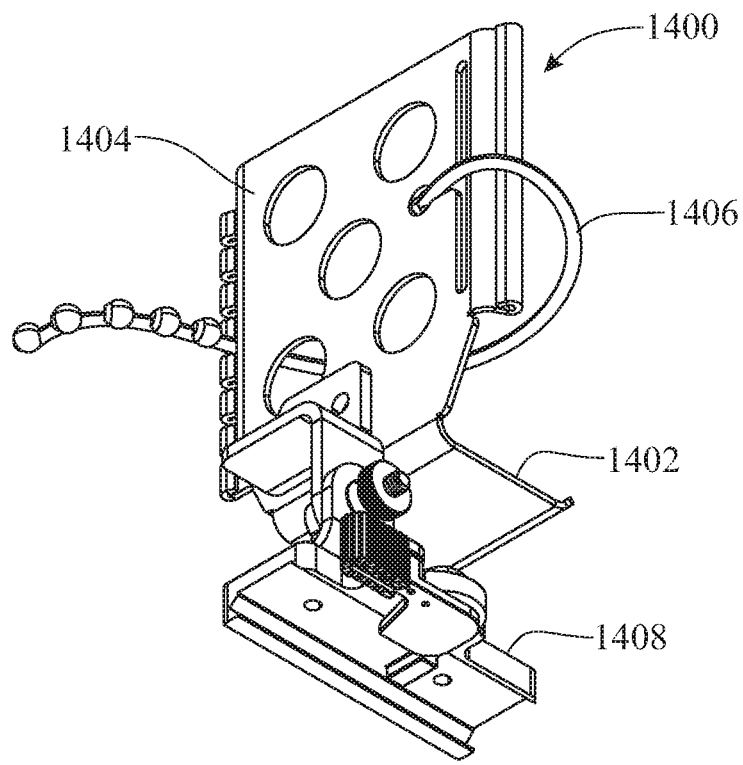

In one embodiment, the handheld measurement, search and safety device 1000 in accordance with the present invention includes a number of field instruments or tactical accessories, each amendable to one or more particular applications, such as may be seen, by way of example, in the alternative illustrative embodiment of FIGS. 13 through 15, that provide responders with a tactical benefit while using the device 1000 to survey objects. As may be seen from the figures, in at least one embodiment, a handheld measurement, search and safety device 1000 may comprise one or more of an instrument mount 1400, a bi-pod 1500, a shield 1506, and/or a platform 1600.

As will be appreciated, while the utility of the extendable member 1114 allows responders to reach out from a safe distance when surveying or searching people, vehicles, facilities, or terrain with field survey instruments for hazardous materials, in some cases the added weight of the extendable member 1114 and/or field instruments or tactical accessories imposes a need for assistance in handling the handheld measurement, search and safety device 1000 in such situations. As such, in at least one embodiment, the handheld measurement, search and safety device 1000 includes a buttstock 1116 that is mounted to the proximate end of the main frame 1102, as illustrated in FIGS. 13 through 15. In one embodiment, the buttstock 1116 is removably attached to the proximate end of the main frame 1102 via an articulating quick connect assembly 1130. As may be seen best from FIGS. 24 and 25, the articulating quick connect assembly 1130 allows the buttstock 1116 to be rotated, relative to the tailpiece 1105 of the main frame 1102, by releasing the lever of articulating quick connect assembly 1130, adjusting the position of the buttstock 1116, and again locking the lever and the buttstock 1116 in position. As before, the buttstock 116 may include either a curved or a planar back end adapted to rest against a user's shoulder to steady the handheld measurement, search and safety device 1000 during use. It is conceivable for buttstock to include a foam or rubber pad or cushion to promote comfort when engaging the buttstock 1116 against a user's shoulder.

In at least one embodiment, either or both the main frame 1102 and/or the extendable member 1114 may comprise a plurality of holes there through so as to reduce the overall weight of a handheld measurement, search and safety device 1000 in accordance with the present invention, such as, by way of example, the holes 126 formed through the extendable member 114 of the handheld measurement, search and safety device 100 such as is shown, for example, in the illustrative embodiment of FIG. 8.

Once again, and as previously stated, a host of handheld field survey instruments, and other tactical accessories, are used, alone or in combination, to perform various functions when detecting, identifying, locating, monitoring, sampling, collecting, transporting or dealing with hazardous materials in the field. For example, there are a number of devices or instruments that are used specifically to survey toxic chemicals, and radioactive materials in potentially dangerous environments. Mounting such handheld field survey instruments, or tactical accessories onto the main frame 1102, or the extendable member 1114, enables trained personnel or responders to gain greater access over distances and eliminate the common practice of surveying dangerous hazmat materials with handheld instruments or accessories. As such, providing a device on which to mount various field instruments and tactical accessories increases safety by eliminating the need for individuals to use their hands when holding instruments in close proximity to hazardous materials, and increases distance between the user and radioactive materials that may be present in or on, surveyed objects, people, vehicles, or packages. The handheld measurement, search and safety device 1000 helps alleviate the fear of responders exposing their hands to possible danger, or coming in close proximity or in contact with hazardous materials. In practice, a variety of different field survey instruments, or tactical accessories, include but are in no manner limited to: tape measures, flashlights, sample collection devices, hooks, claws, clamps, snips, tweezers, needles, pipets, syringes, swabs, loops, socket tools, screw drivers, four-star screw drivers, wrenches, mirrors, visual contrast plates, lasers, rangefinder, lasers, cameras, video cameras, shields, cables, ropes, Geiger counters, radiation isotope identification and quantification devices (RID), metal detectors, alpha/beta gamma radiation detectors, magnets, containers, cups, marking devices, smart phones, transmitters, receivers, transceivers, spectrometers, ultraviolet lights, platforms, brushes, sponges, large swabs, or any combination thereof.

The present handheld measurement, search and safety device 1000 provides the ability to quickly and easily mount and interchange any of the field survey instruments, and/or tactical accessories, for use in hazmat applications. One exemplary mount used for employing field survey instrument comprises a cylindrical instrument mount 1200, as shown in FIG. 26 through 29. The cylindrical instrument mount 1200 is designed to securely hold field survey instruments that may include a handle having a round body. In one exemplary embodiment, the cylindrical instrument mount 1200 holds a radioisotope identification device, or RIID 1300 that is employed in the field to measure radioactivity. The cylindrical instrument mount 1200 includes an articulating quick connect assembly 1202 adapted for attaching the cylindrical instrument mount 1200 to the distal end of the extendable member 1114, such as via a picatinny rail 1128. The cylindrical instrument mount 1200 includes an extended bracket 1204 having a predetermined length, and a pair of clamps 1206, 1208 that are each attached to the extended bracket 1204 and adapted to hold the rounded handle 1302 of the RIID 1300. Each clamp 1206, 1208 may include rigid, jaw like members or may comprise straps having fasteners such as nuts and bolts, or bolts and wing nuts that are used to tighten the clamps 1206, 1208 onto the handle 1302 of the RIID 1300 to securely hold and retain the RIID 1300 onto the cylindrical instrument mount 1200 adjacent the distal end of the extendable member 1114. The articulating quick connect assembly 1202 may comprise a releasable-lock mount in which a user simply slides the releasable-lock mount in position along the picatinny rail 1128 to retain the mount 1200 in position on the picatinny rail 1128. With reference to the illustrative embodiment of FIG. 29, by virtue of the articulating quick connect assembly 1202, the sensor of the RIID 1300 may be quickly and easily rotated into any of a plurality of operative positions, such as may be required based on the various conditions which a user may encounter in the field.

Figure 26:
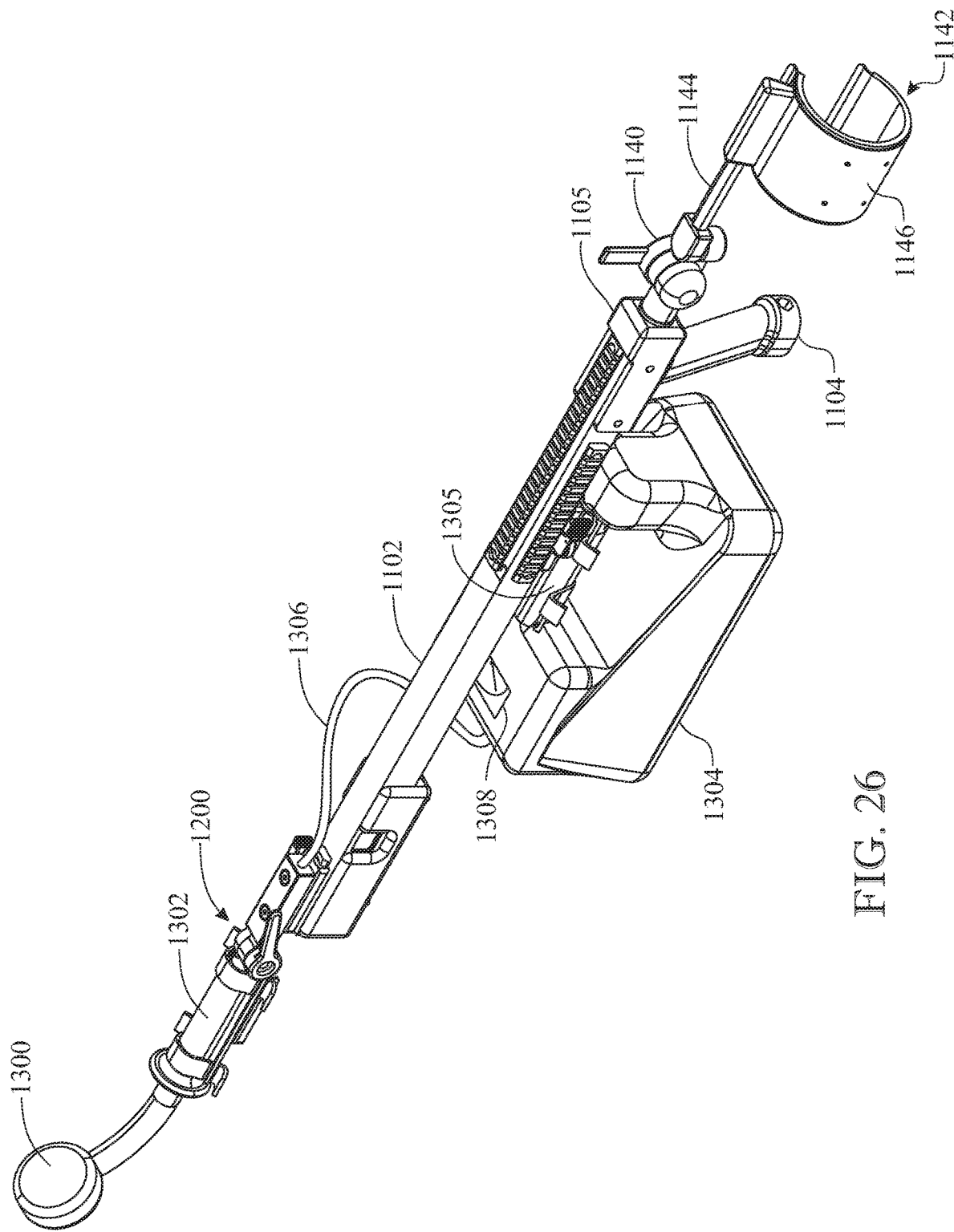
FIG. 26 presents an upper left side perspective view of an alternate illustrative embodiment of a handheld measurement, search and safety device having a radioisotope identification device (RIID), a meter and an arm brace mounted thereto, in accordance with the present invention.
Figure 27:
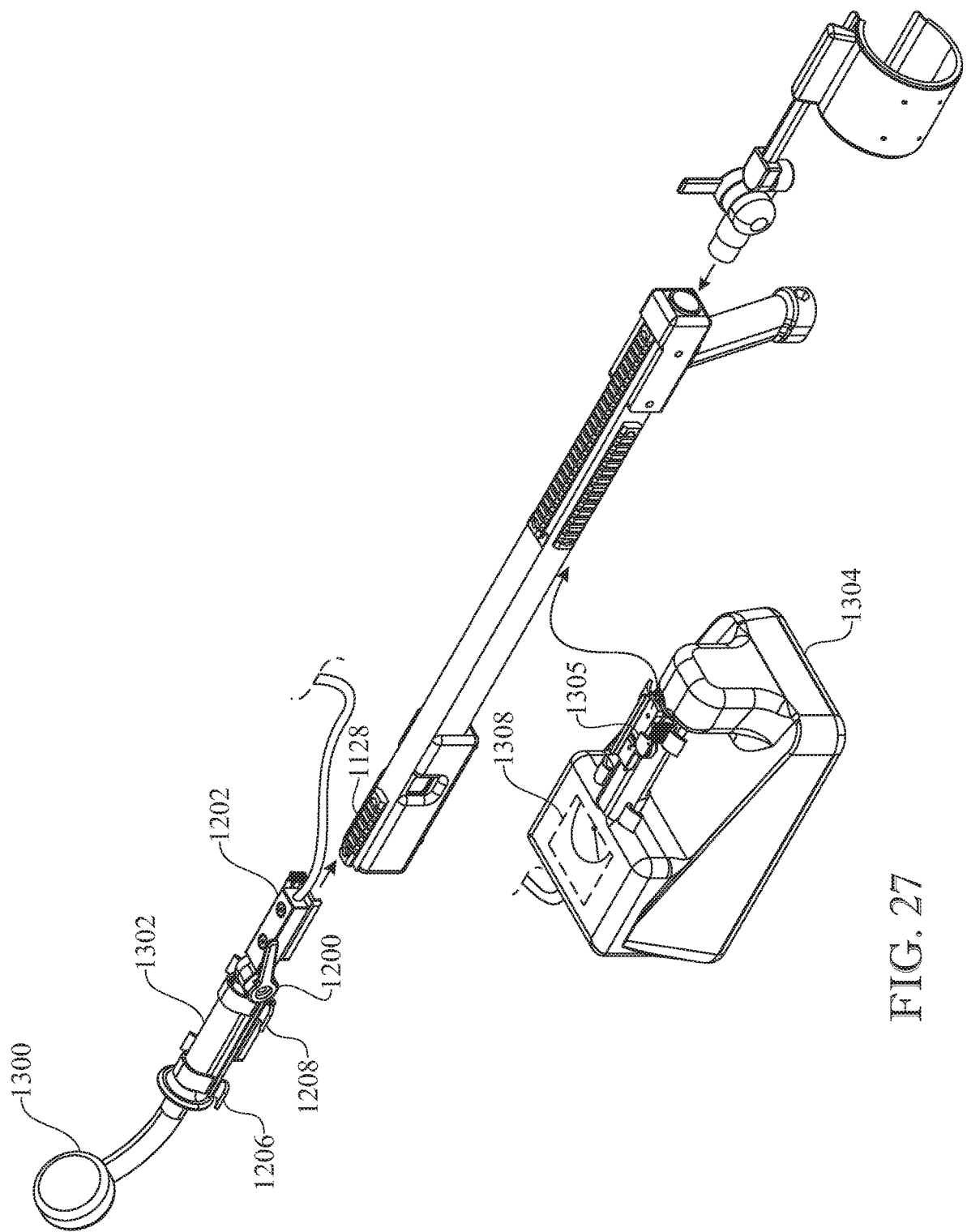
FIG. 27 presents a partially exploded upper left side perspective view of the alternative embodiment of the handheld measurement, search and safety device of FIG. 26 having a radioisotope identification device (RID), a meter and an arm brace, in accordance with the present invention.
Figure 28:
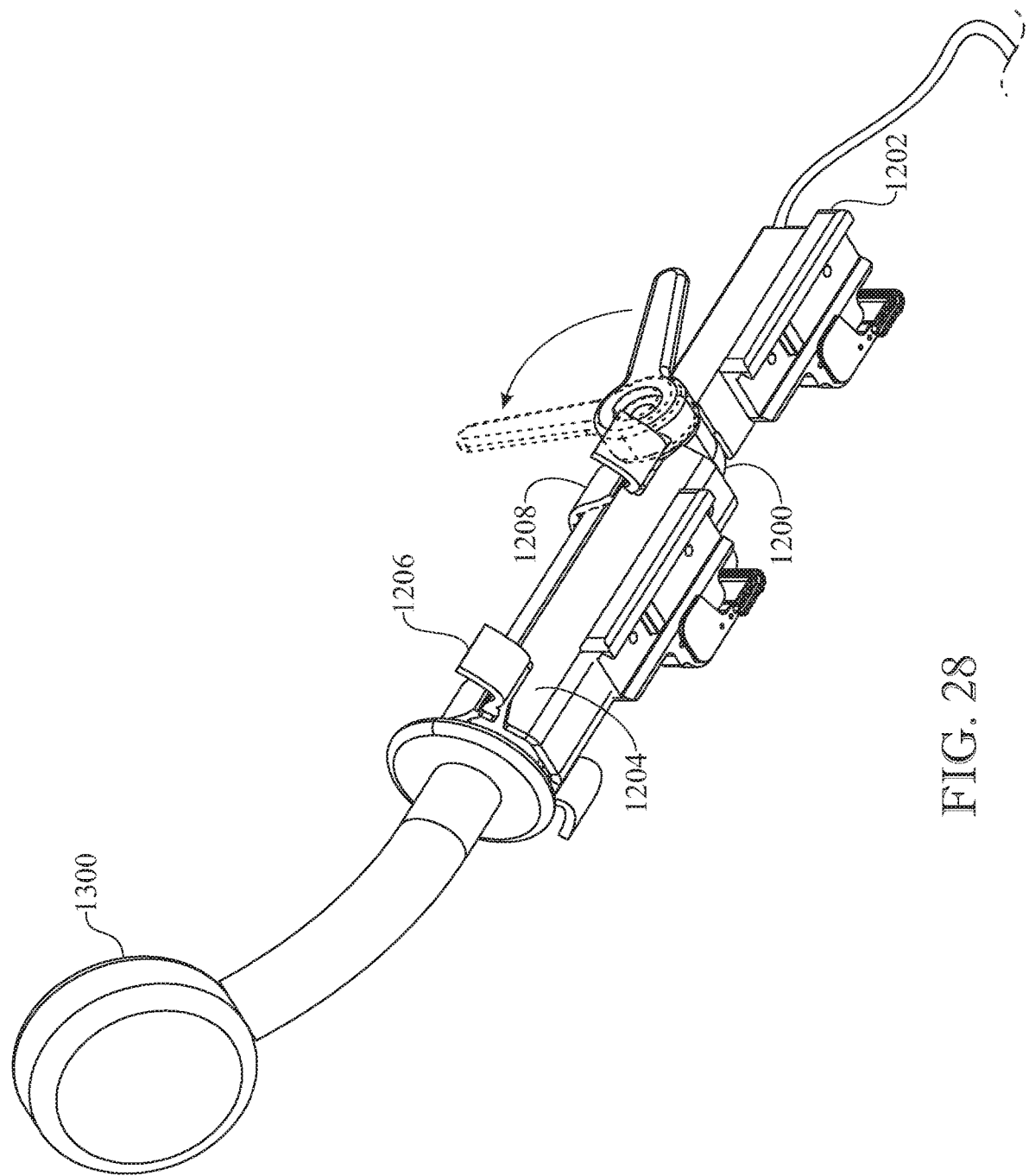
FIGS. 28 and 29 present perspective views of one illustrative embodiment of an RIID for use with a handheld measurement, search and safety device, in accordance with the present invention.
Figure 29:
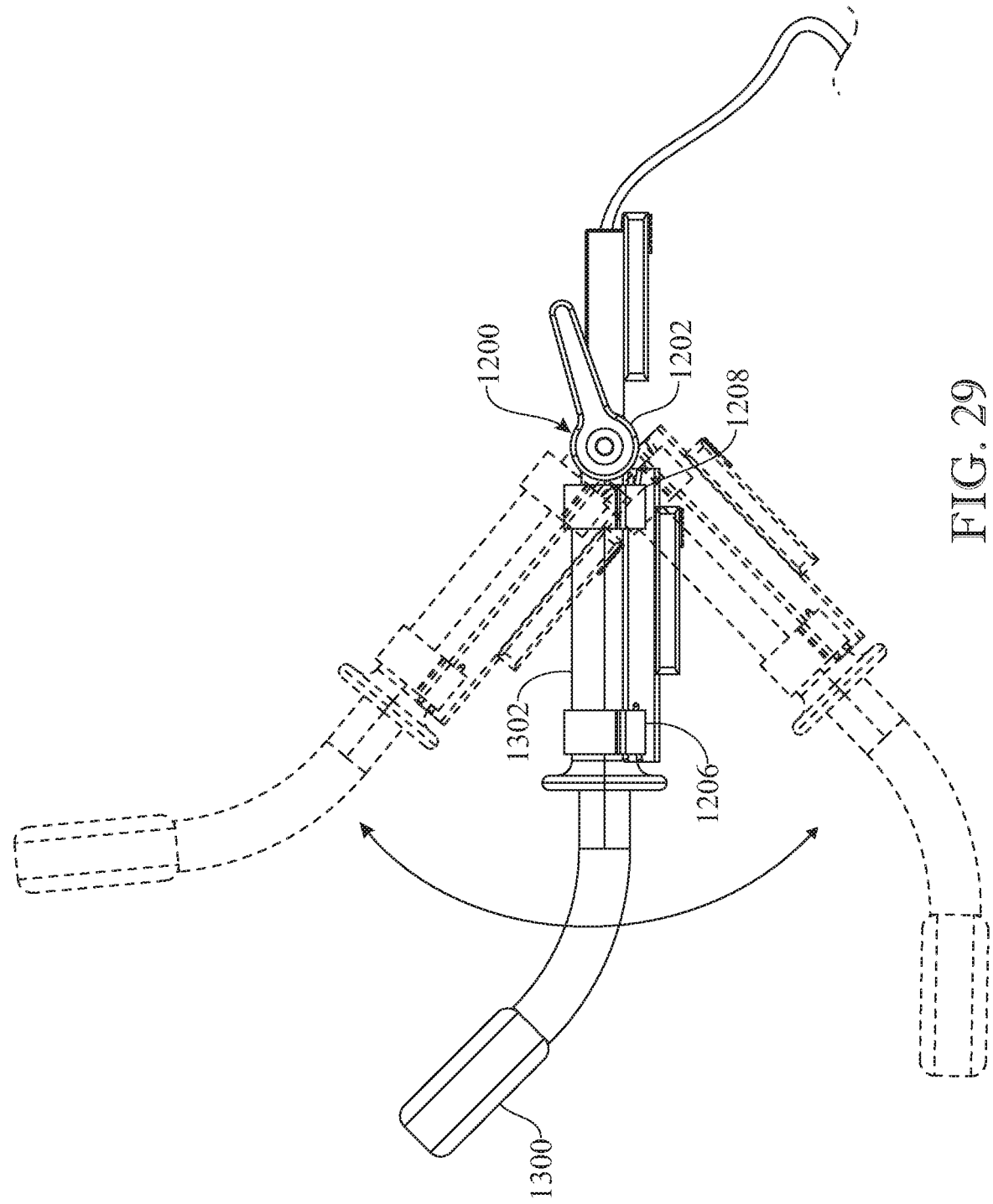
Figure 30:
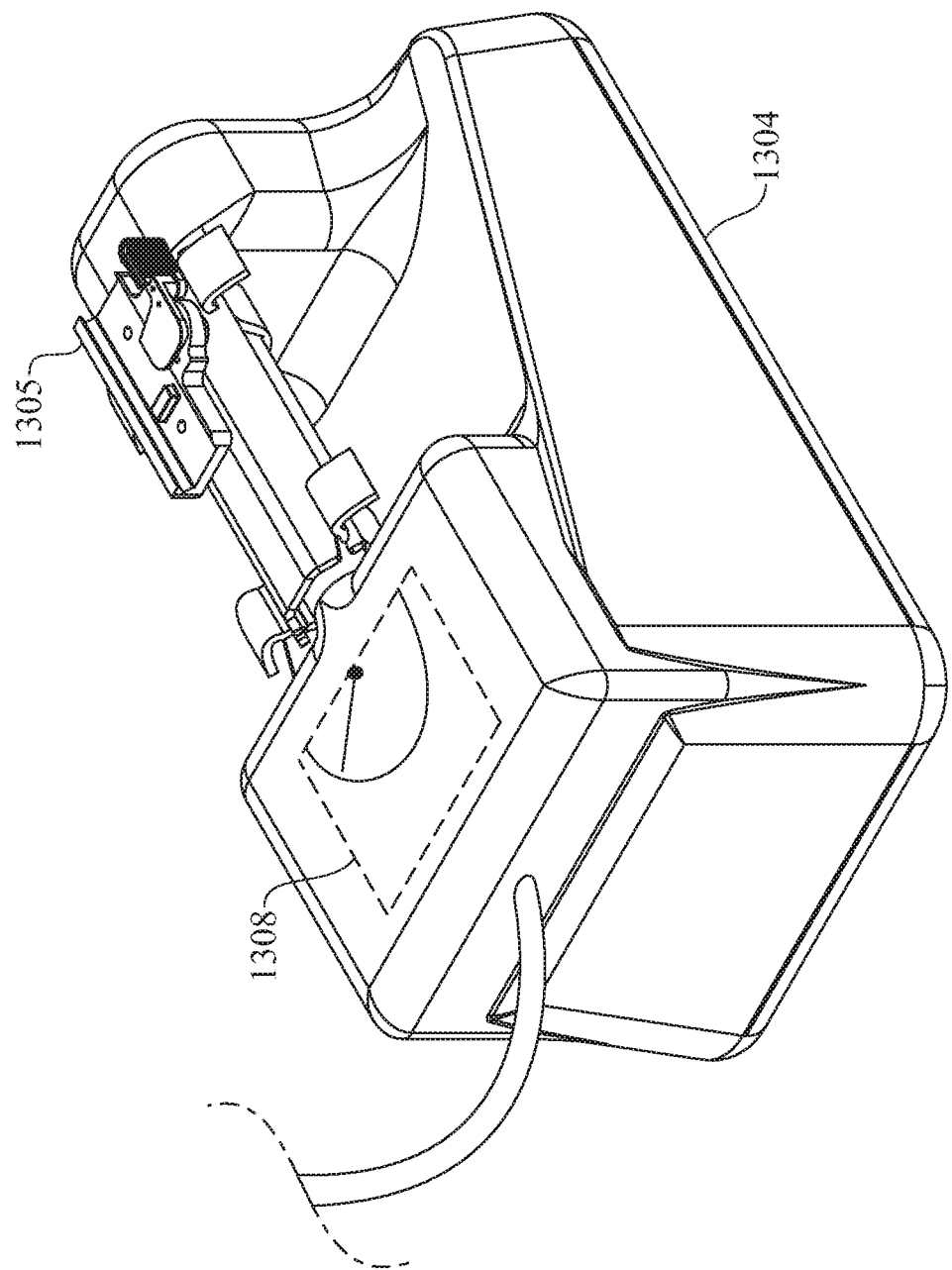
FIG. 30 presents a perspective view of one illustrative embodiment of a meter for use with a handheld measurement, search and safety device, in accordance with the present invention.

With continued reference to FIGS. 26 and 27, in at least one further embodiment, the present handheld measurement, search and safety device 1000 comprises a meter 1304 which is operatively interconnected to the radioisotope identification device, or RIID 1300, such as via a cable 1306. The meter 1304 comprises a handle and a quick connect assembly 1305 to facilitate mounting the meter 1304 to a portion of the main frame 1102, as shown in the figures. Importantly, the meter 1304 comprises a meter display 1308 which remains readily visible to a user of the present handheld measurement, search and safety device 1000, while he or she positions the sensor of the RIID 1300 proximate a suspicious package, person, etc., all the while maintaining a safe distance from such person, package, etc. FIG. 30 presents a perspective view of one embodiment of a meter 1304 having a meter display 1308. In at least one embodiment, the meter 1304 comprises a Ludlum Model 14C general purpose survey meter, as manufactured by Ludlum Measurements, Inc. of Sweetwater, Tex. As will be appreciated by those of skill in the art, the Ludlum Model 14C is among the most popular and widely used meters in use today for surveying potentially radioactive materials.

With reference once again to the alternative illustrative embodiment of FIGS. 14 through 18, an instrument mount 1400 is another accessory which may be utilized with a handheld measurement, search and safety device 1000 in accordance with the present invention. As before, an instrument mount 1400 is designed for holding a variety of different field survey instruments or tactical accessories at a distal end of an extendable member 1114. The instrument mount 1400 includes a base plate 1402 attached to a vertical plate 1404 and a holding strap 1406 for securely holding and retaining a field instrument in place on the base plate 1402, and against the vertical plate 1404. The instrument mount 1400 is removably attached to the distal end of the extendable member 1114 via an articulating quick connect assembly 1408. As shown best in FIG. 16, in at least one embodiment, the articulating quick connect assembly 1408 is designed to attach to the picatinny rail 1128 of the extendable member 1114. By virtue of the articulating quick connect assembly 1408, the present instrument mount 1400 may be utilized to hold a variety of different field survey instruments or tactical accessories at the distal end of the extendable member 1114 in any of variety of positions, by simply rotating the position of instrument mount 1400 relative to the extendable member 1114 via the articulating quick connect assembly 1408, as is shown best, once again, in FIG. 16.

There likely will be situations when trained personnel or responders will assume a prone, kneeling, or laying position when surveying objects in hazmat applications or conditions. The handheld measurement, search and safety device 1000 accommodates such conditions by allowing responders to quickly and easily install a stabilizer, such as a bi-pod 1500 to stabilize the handheld measurement, search and safety device 1000 in a generally horizontal position. The practical use of the bi-pod 1500 is beneficial when using the handheld measurement, search and safety device 1000 for distance measurement applications in support of evidentiary materials. As shown best in FIGS. 19 and 20, a bi-pod 1500 includes a body 1502 equipped with a quick connect mount 1504 for removably mounting the bi-pod 1500 securely to the main frame 1102, such as, by way of example, via one of the picatinny rails. The body 1502 comprises a pair of legs 1510 attached thereto. As before, each leg 1510 may comprise any length having a round or rectangular body. Also as before, each leg 1510 may include feet, pads, cushions, or the like to further stabilize the horizontal position of the present handheld measurement, search and safety device 1000, and prevent the device 1000 from slipping along a horizontal planar support. It is understood that other stabilizers may be implemented for use with the handheld measurement, search and safety device 1000 including but not limited to, a tri-pod, or any of a variety of gun rests that are generally used for firearms.

Figure 19:
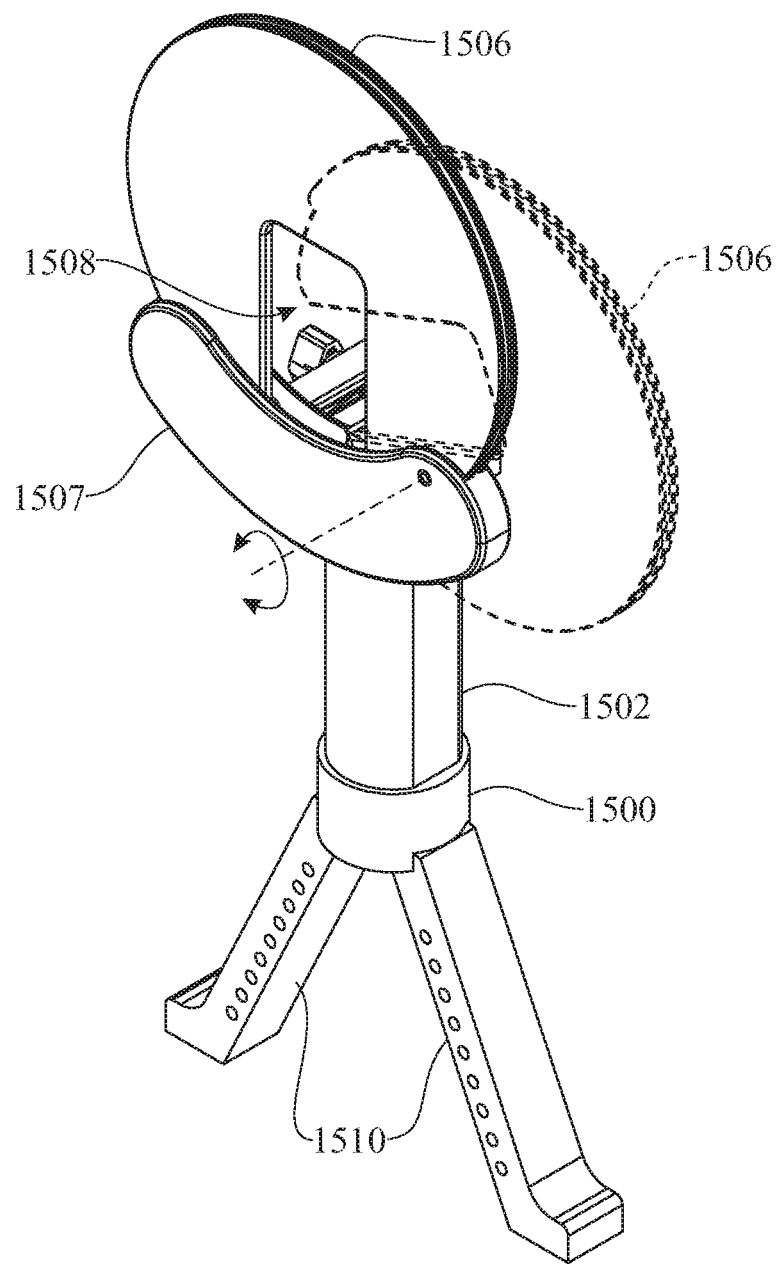
FIGS. 19 and 20 present perspective views of one illustrative embodiment of a bi-pod and a shield for use with a handheld measurement, search and safety device, in accordance with the present invention.
Figure 20:
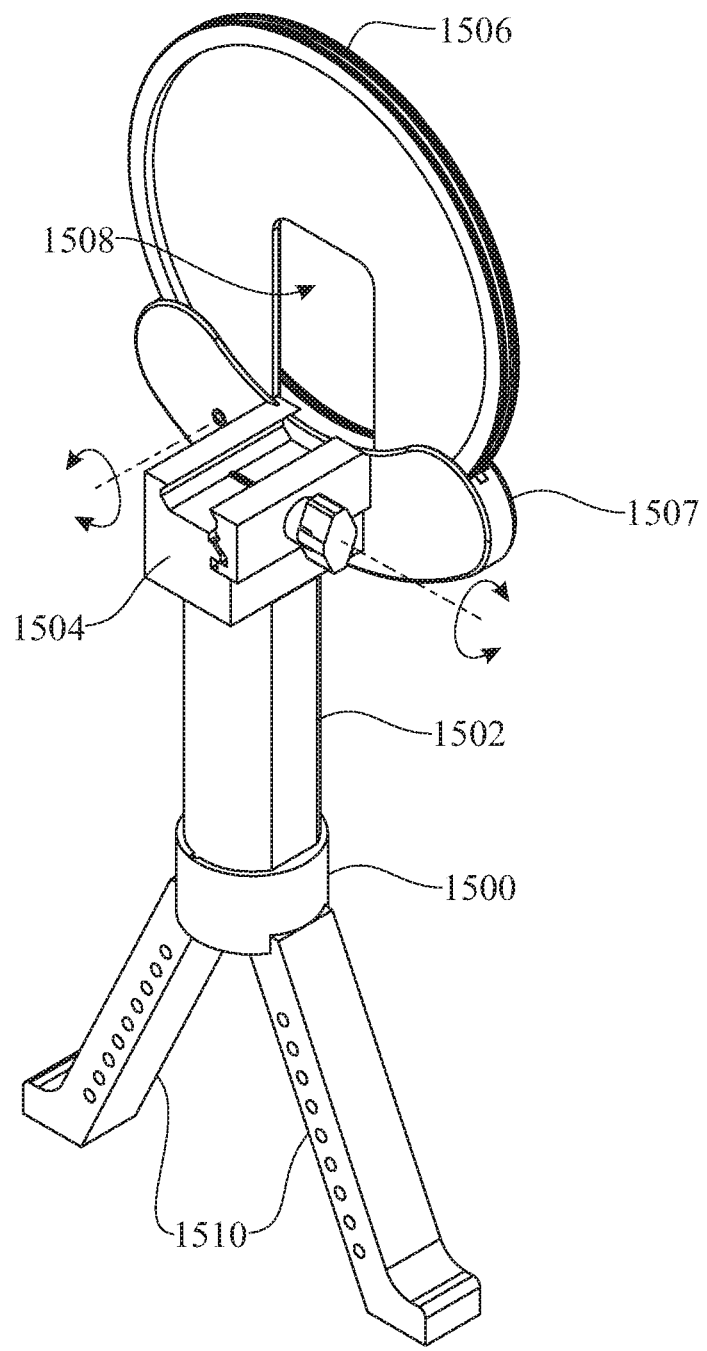

With continued reference to FIGS. 19 and 20, and as mentioned before with reference to FIGS. 14 and 15, in at least one embodiment, a handheld measurement, search and safety device 1000 in accordance with the present invention includes a shield 1506. In at least one further embodiment, a shield 1506 comprises a removable lead shield. In one embodiment, and as shown in the figures, a shield 1506 comprises a circular shape, somewhat resembling a dinner plate. The thickness of the shield 1506 may vary based on the hazard being investigated, as well as by weight requirements. In one embodiment, a shield 1506 may have a thickness of about one-sixteenth of an inch to about three-quarters of an inch. In one further embodiment, a shield 1506 may have a thickness of about one-eighth of an inch. A stiffener or backing may be attached to the back of a shield 1506 to stiffen the pliable nature of the lead material used. Multiple shields 1506 may be stacked so as to provide additional protection as warranted by estimations of potential exposure. A frame port 1508 is formed through at least a portion of a shield 1506 to facilitate mounting the shield 1506 onto a portion of a main frame 1102 or an extendable member 1114. As shown in FIGS. 19 and 20, in accordance with one embodiment, a shield 1506 rests in a cradle 1507, and as may be seen from FIG. 19, in at least one further embodiment, the shield 1506 is pivotally interconnected to the cradle 1507, so as to facilitate positioning a frame port 1508 into an operative orientation relative to a portion of a main frame 1102 or an extendable member 1114. In at least one embodiment, a frame port 1508 comprises a cut-out to allow the shield 1506 to be mounted to the main frame 1102 from below by means of a quick connect assembly, such as, quick connect assembly 1504 The purpose of the cut-out is to allow for direct visual line of sight between the operator and an RIID 1300 mounted at a distal end of the present device 1000. The purpose of combining a shield 1506 with an RIID 1300 on a handheld measurement, search and safety device 1000 is to protect the operator to the greatest degree practicable from ionizing radiation.

Figure 21:
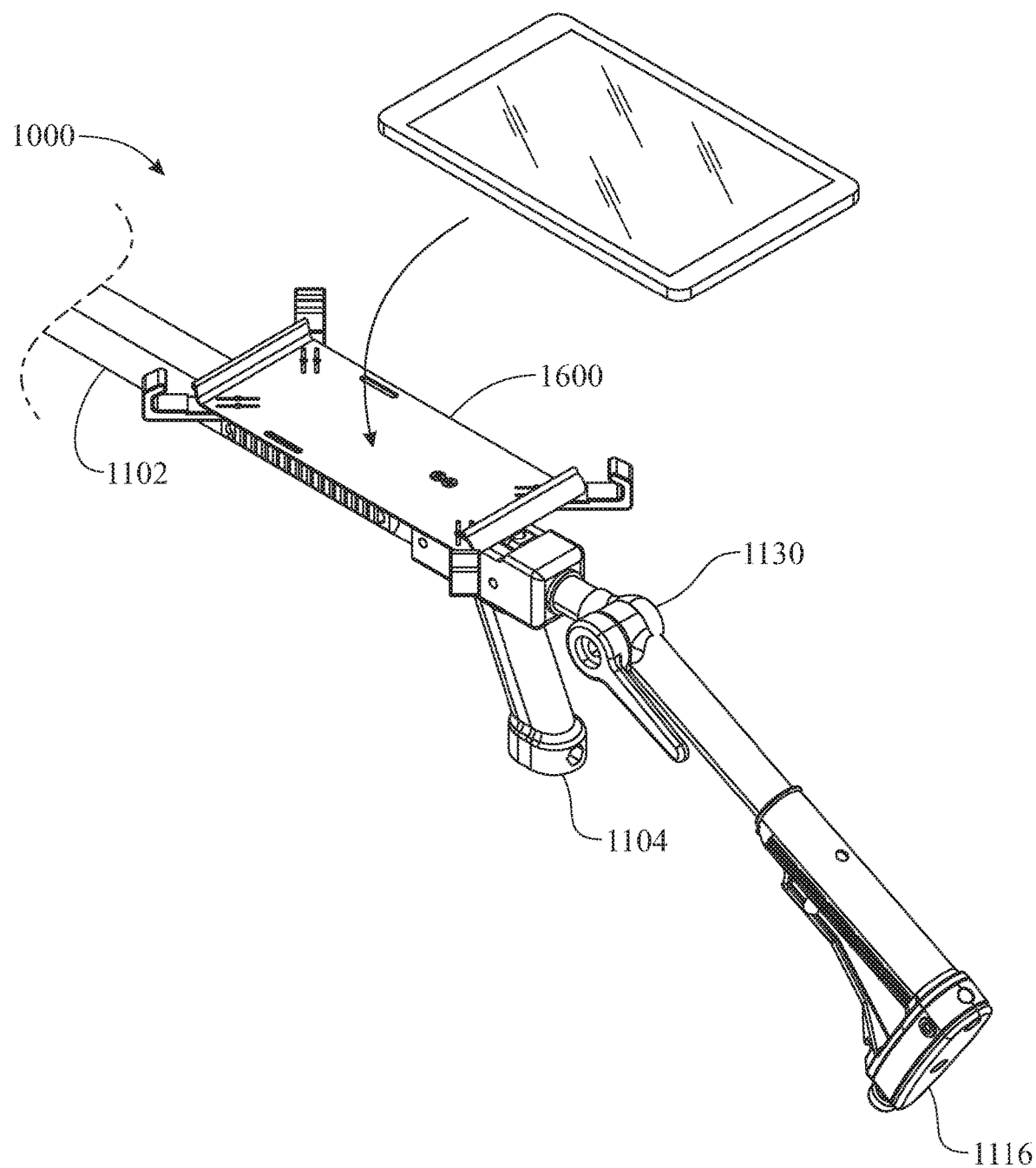
FIGS. 21 through 23 present perspective views of one illustrative embodiment of a platform for use with a handheld measurement, search and safety device, in accordance with the present invention.
Figure 22:
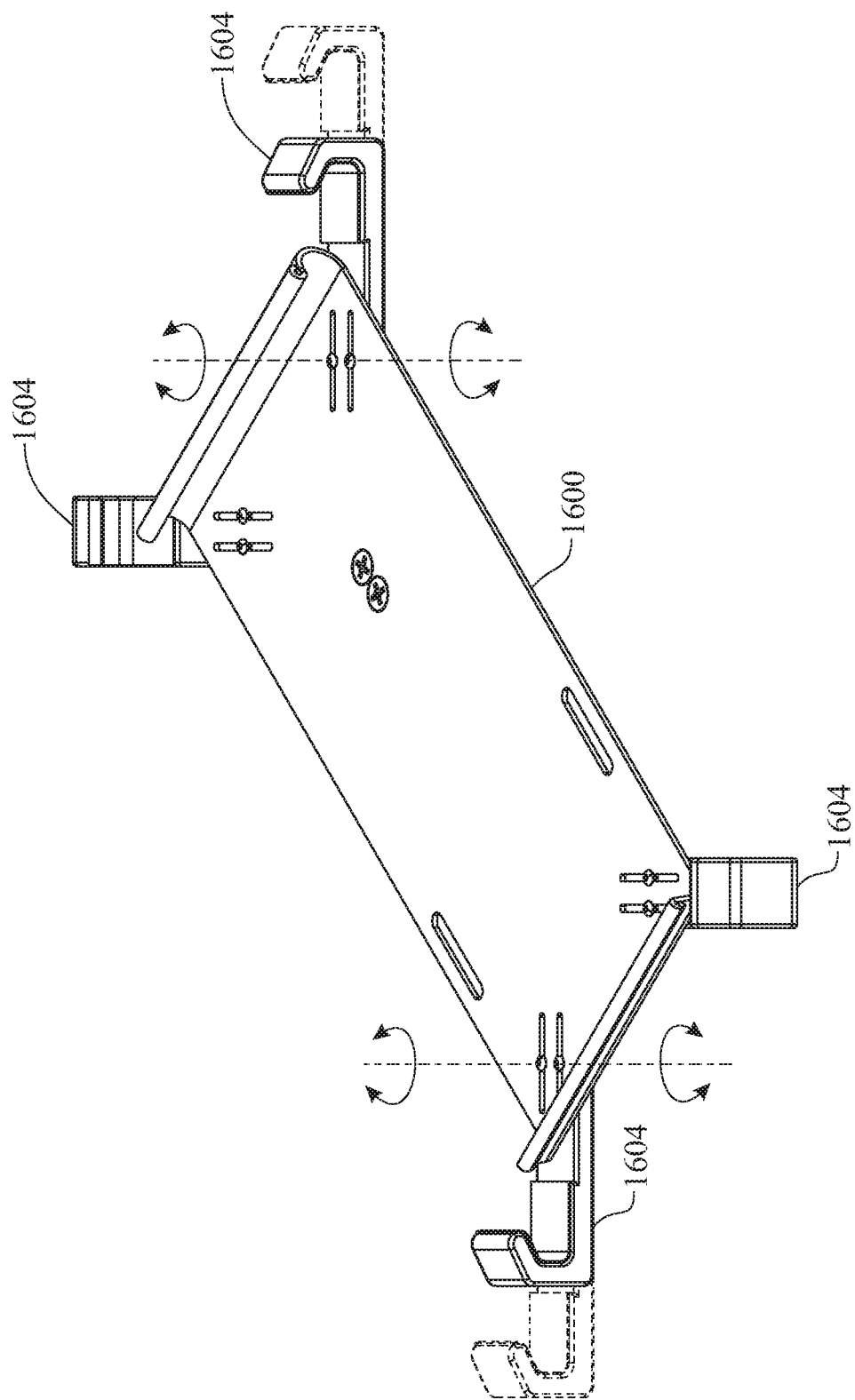
Figure 23:
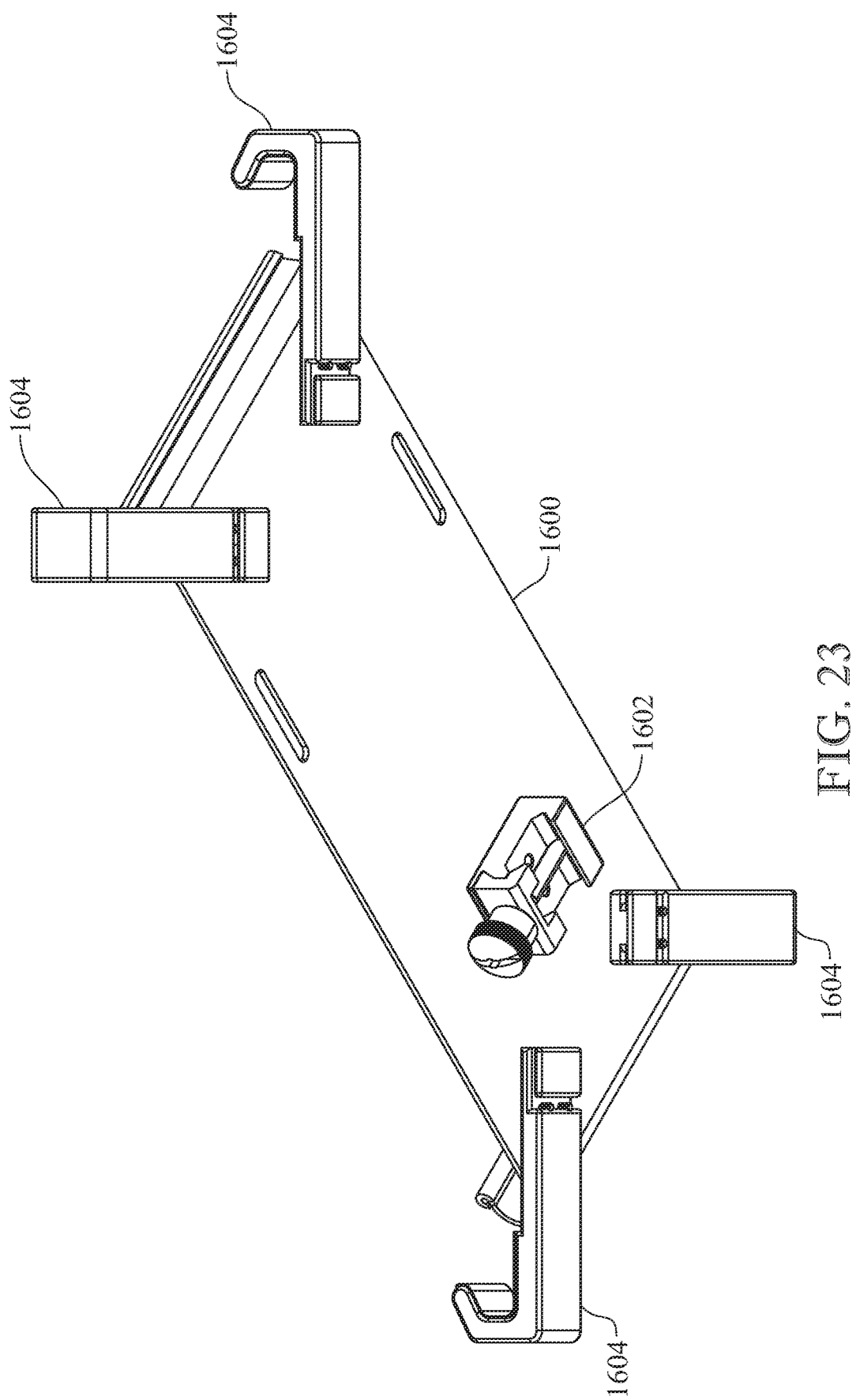
Figure 24:
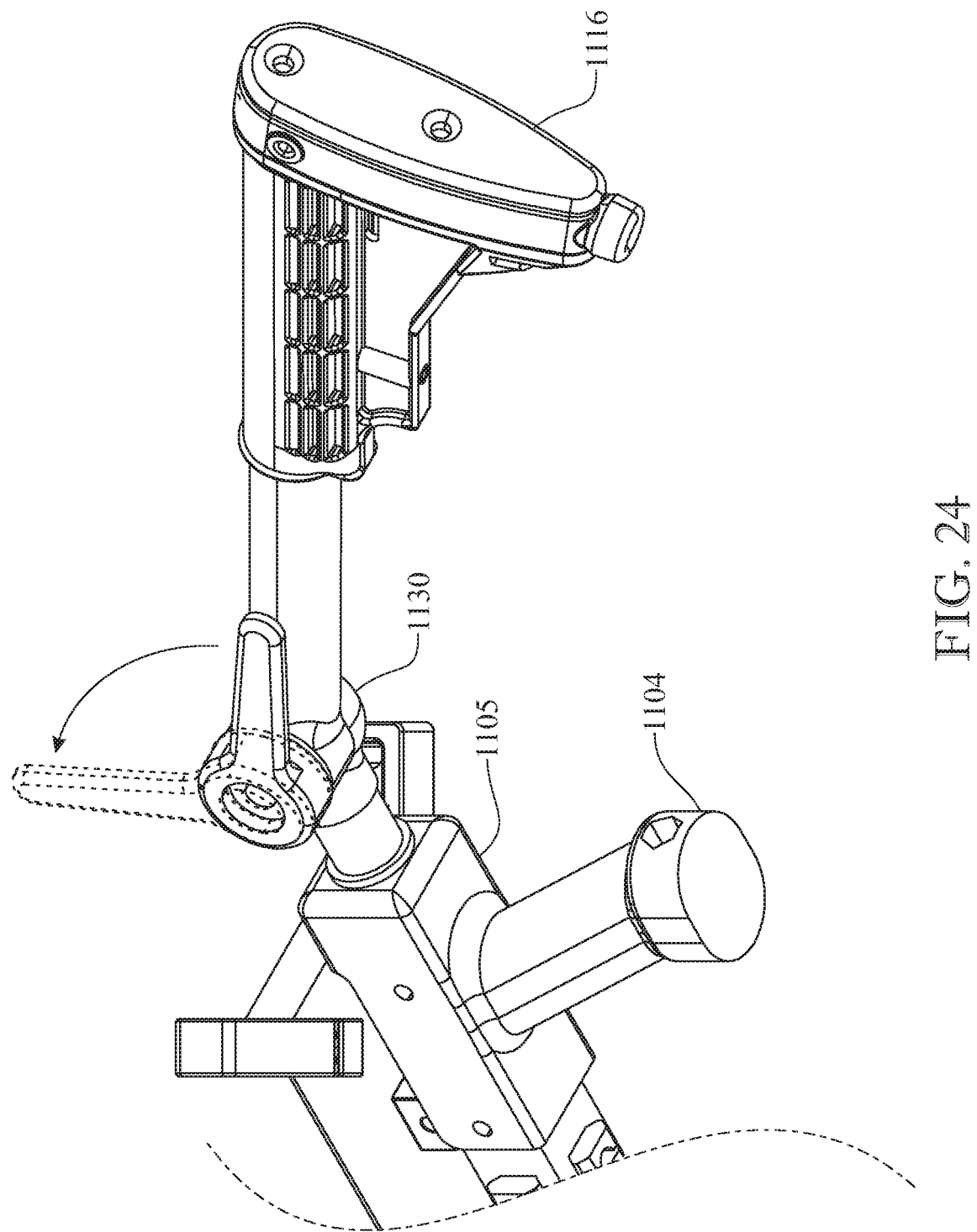
FIGS. 24 and 25 present perspective views of one illustrative embodiment of a buttstock for use with a handheld measurement, search and safety device, in accordance with the present invention.
Figure 25:
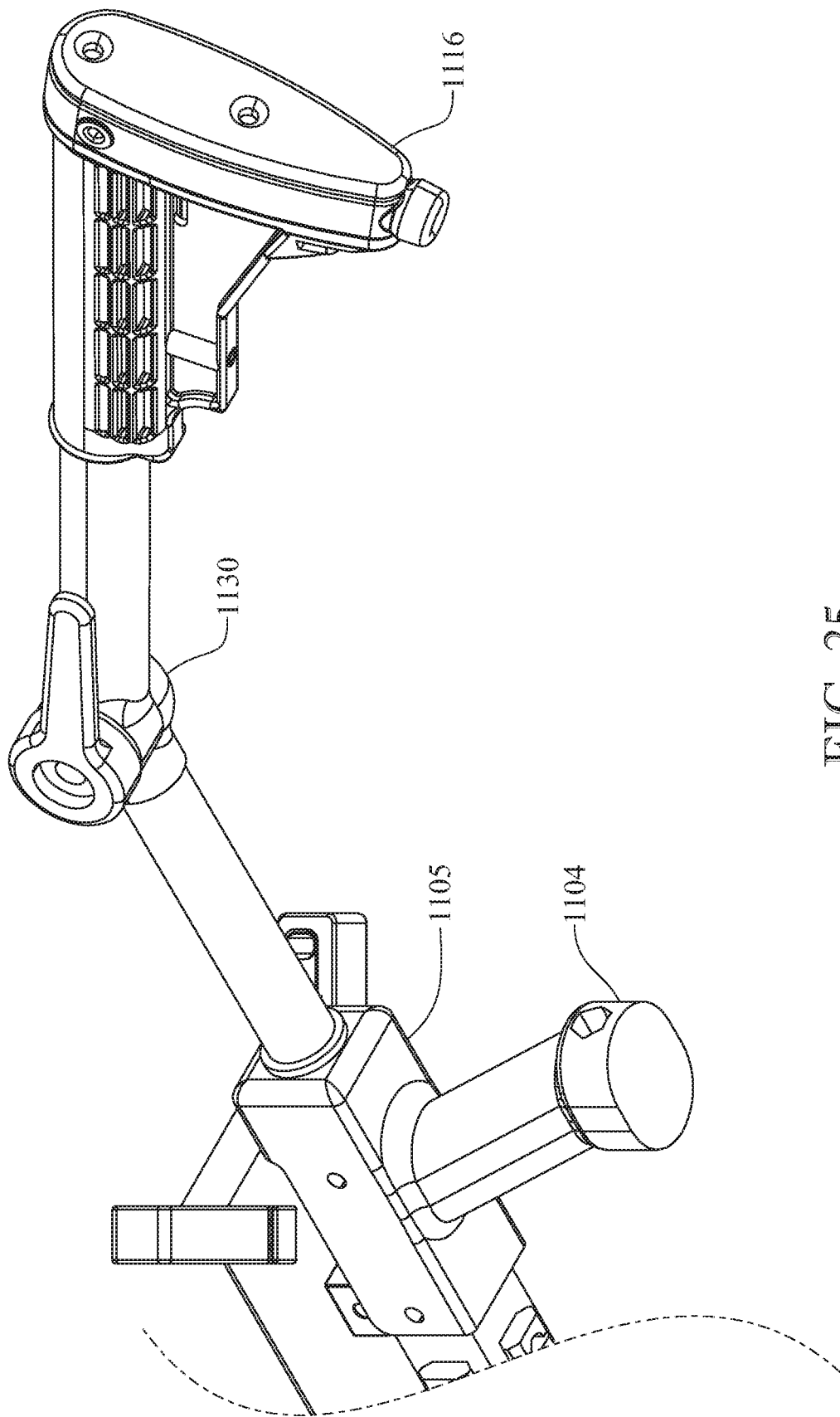

Turning next to FIGS. 21 through 23, and as also shown in FIGS. 14 and 15, in at least one embodiment, a handheld measurement, search and safety device 1000 comprises a platform 1600 disposed in a generally horizontal planar arrangement relative to the device 1000. As may be seen from the figures, the platform 1600 includes a quick connect assembly 1602 to removably attach the platform 1600 to a picatinny rail, such as by way of example, picatinny rail 1106 that is provided on the top surface of the main frame 1102, above the handle 1104 of the present device 1000. The platform 1600 is dimensionally constructed to securely hold various articles, including but not limited to, an electronic tablet, such as is shown by way of example in FIG. 21, or a phone, notebook, regulation sheets, etc., among other articles. The quick connect assembly 1602 may comprise a locking bracket that permits a user to easily position the platform 1600 onto the main frame 1102. In one embodiment, a frictional material such as rubber, may be provided on the support surface of the platform 1600 to enhance frictional holding, and prevent slippage of, any objects or articles disposed on the platform 1600. In one embodiment, a small electronic light may be installed on, or integrally included with, the platform 1600 to allow responders to visually see articles stored on the platform 1600 in low lit or dark areas. In one further embodiment, one or more clamps or adjustable arms 1604 may be provided to hold the articles or objects on the top platform 1600. For example, adjustable arms 1604 may be beneficial in retaining an electronic tablet on the platform 1600. As before, in at least one embodiment, a platform 1600 has a conspicuously colored leading front edge, such as a bright fluorescent orange color, that serves as a visual que for photographic evidence.

Figure 31:
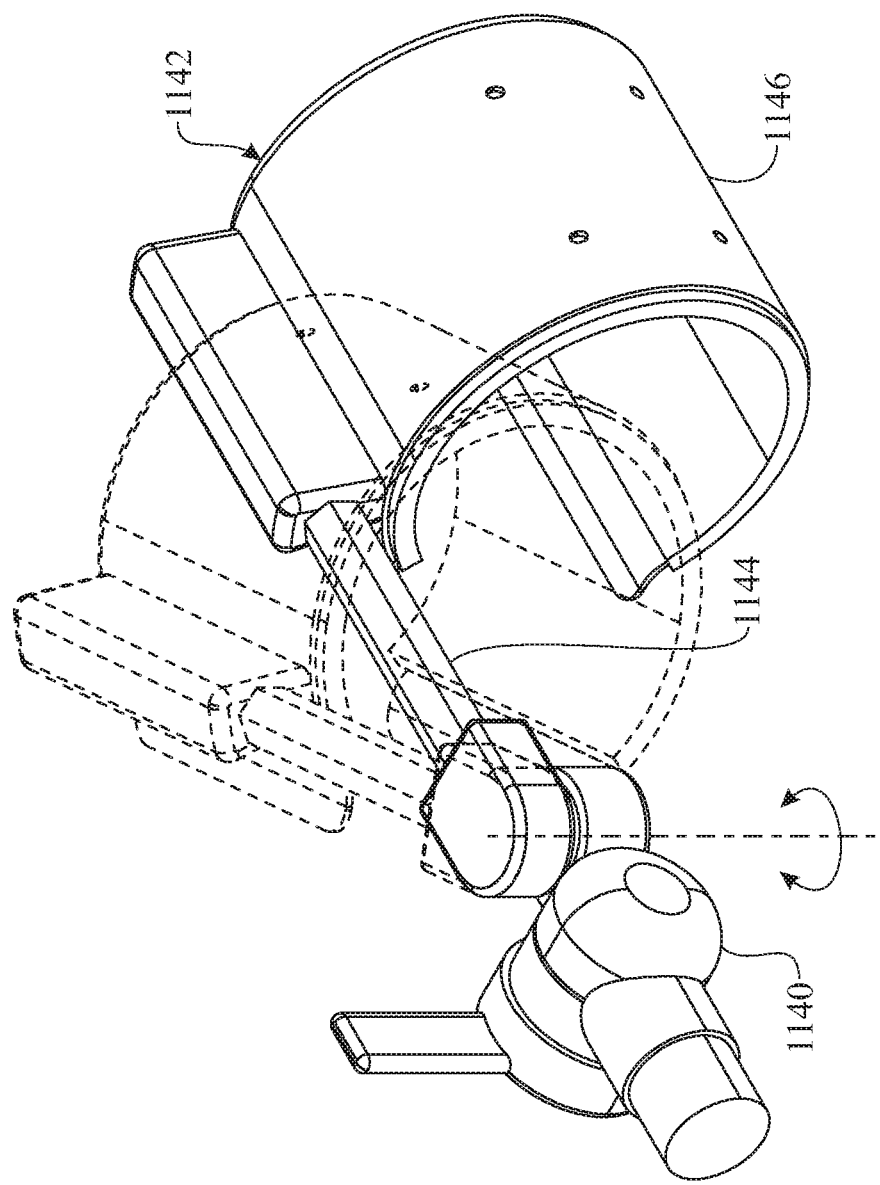
FIGS. 31 through 33 present perspective views and an elevation of one illustrative embodiment of an arm brace for use with a handheld measurement, search and safety device, in accordance with the present invention.
Figure 32:
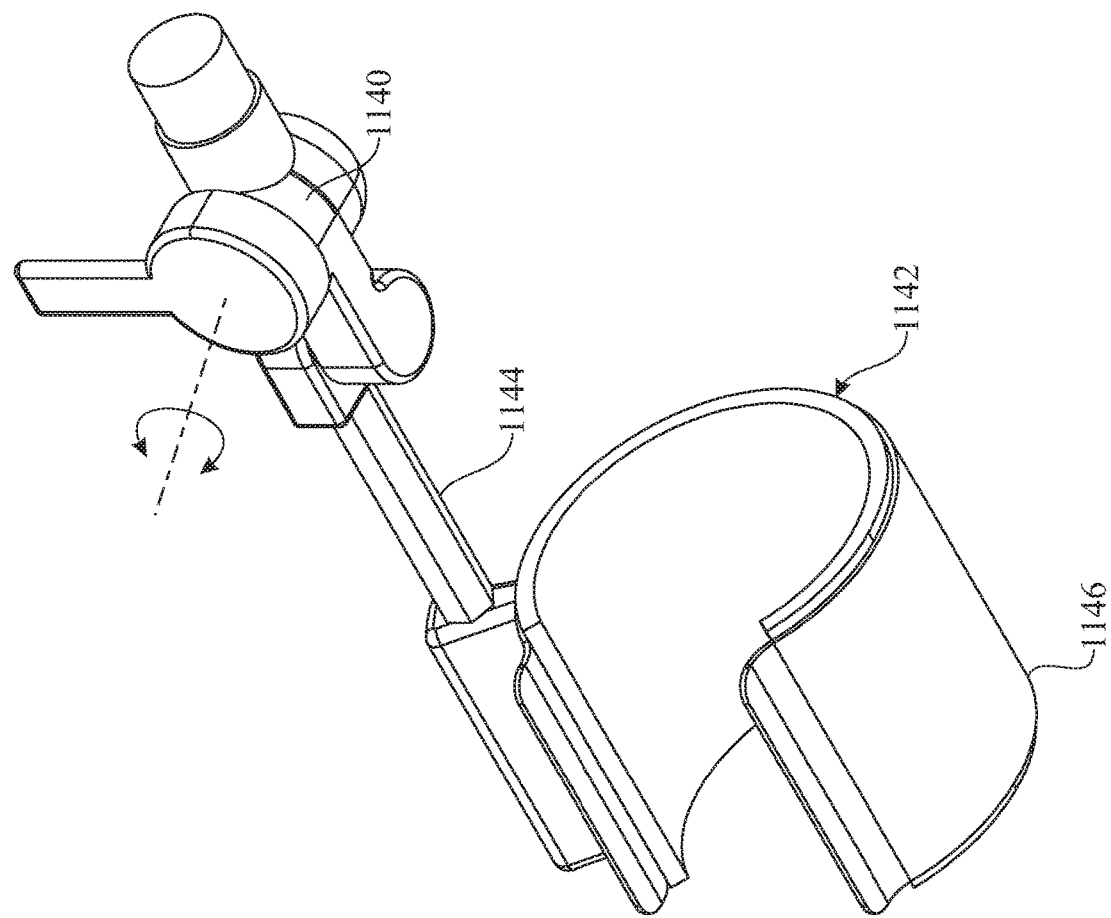
Figure 33:
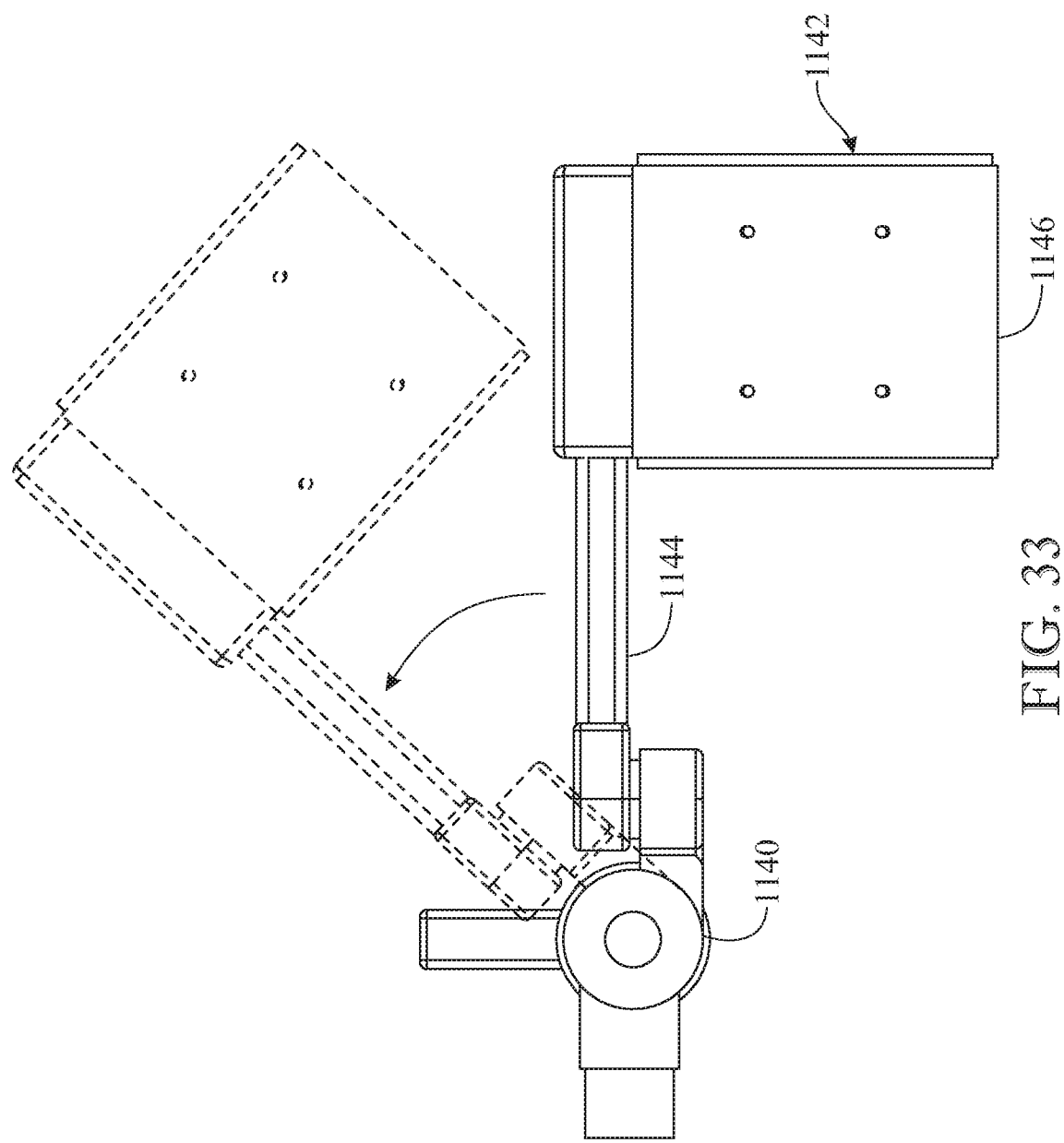

Looking next to FIGS. 31 through 33, the handheld measurement, search and safety device 1000 gives responders the tactical advantage of surveying people, packages, or objects for hazardous materials in close, tight rooms, spaces, or quarters where use of the extendable member 1114 would hinder such efforts. In achieving this purpose, the handheld measurement, search and safety device 1000 is adaptable for use in a one-handed configuration by employing an interchangeable support member comprising an arm brace 1142, in lieu of a buttstock 1116. In one embodiment, the arm brace 1142 includes a brace extension 1144 having a predetermined length with one end coupled to a brace body 1146, and another end releasably attached to the proximate end of the main frame 1102, such as via an articulating quick connect assembly 1140. As shown best in FIGS. 31 and 33, the articulating quick connect assembly 1140 allows the arm brace 1142 to be rotated into a variety of positions relative to a main frame 1102 of a handheld measurement, search and safety device 1000.

As before, the brace body 1146 includes a generally C-shaped member adapted for quickly and easily installing the brace body 1146 onto a person's forearm. In one non-limiting embodiment, the brace body 1146 may comprise a flexible, plastic material that resiliently expands or flexes outwardly apart to permit mounting the brace body 1146 on individuals with larger forearms. It will be noted however, that the brace body 1146 may also comprise a fully, enclosed or encircled brace in which responders insert one hand into the hollow region of the enclosed or encircled brace, and then grasp the handle 1104 with one hand. It will be understood that the brace extension 1144 may comprises any geometric shape such as round, or rectangular, and may also include a telescoping mechanism that allows users to adjust the length of the brace extension 1144 during use. It will be understood that any of a number of brace bodies 1146 may be used as well.

The arm brace 1142 allows responders to navigate and maneuver the handheld measurement, search and safety device 1000 with one hand by quickly and easily positioning the brace body 1146 onto the person's forearm while grasping and holding the handle 1104 in one hand via the grip 1122. In using one hand, first responders can easily and quickly survey objects, with a field survey device such as a radioisotope identification device (RIID) 1300 to measure, detect or identify different forms of radiation including alpha and/or gamma radiation materials that may be present. The objects to be surveyed, for example, may be situated within a small, confined room, area, or space that would make use of the extendable member 1114 impractical or simply not possible, and as such, an arm brace 1142 is provided wherein responders can survey objects or people at shorter distances and within smaller, confined areas, with or without the use of the extendable member 1114. The brace body 1146 may include foam or rubber padding or cushion to enhance comfort and to lessen pressured impact of the brace against a user's arm during use. It is contemplated that to further steady the handheld measurement, search and safety device 1000 against a responder's forearm during use, the arm brace 1142 may include a short, adjustable strap to attach the brace body 1146 to a user's forearm. As one example, a short, adjustable strap may extend between opposite, lateral edges of the brace body 1146, and include buttons, buckles, hook and loop type fasteners, rings, magnets, or other fasteners for attaching the strap in place.

Figure 34:
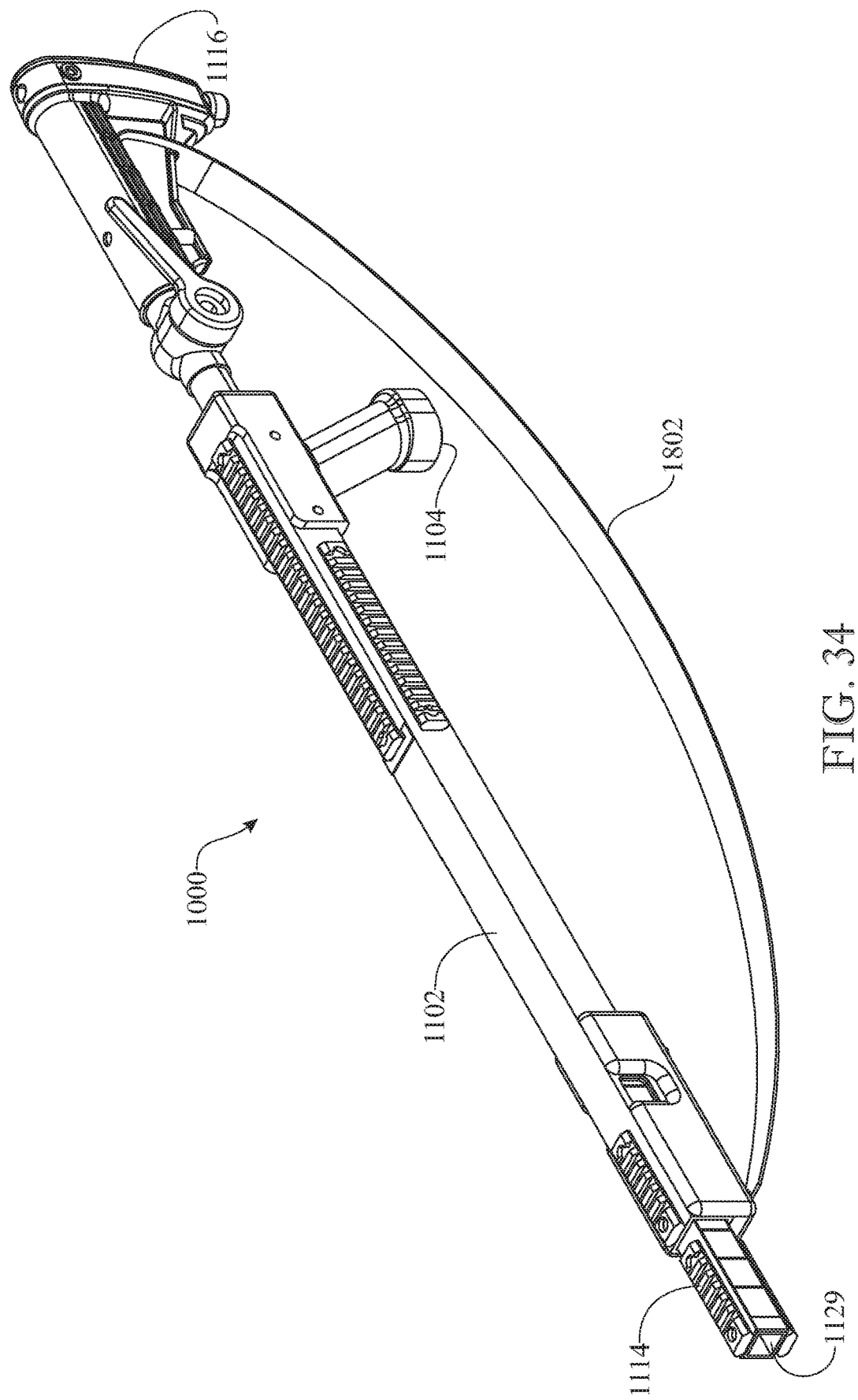
FIGS. 34 and 35 present perspective views of an illustrative embodiment of a handheld measurement, search and safety device having a strap attached thereto, in accordance with the present invention.
Figure 35:
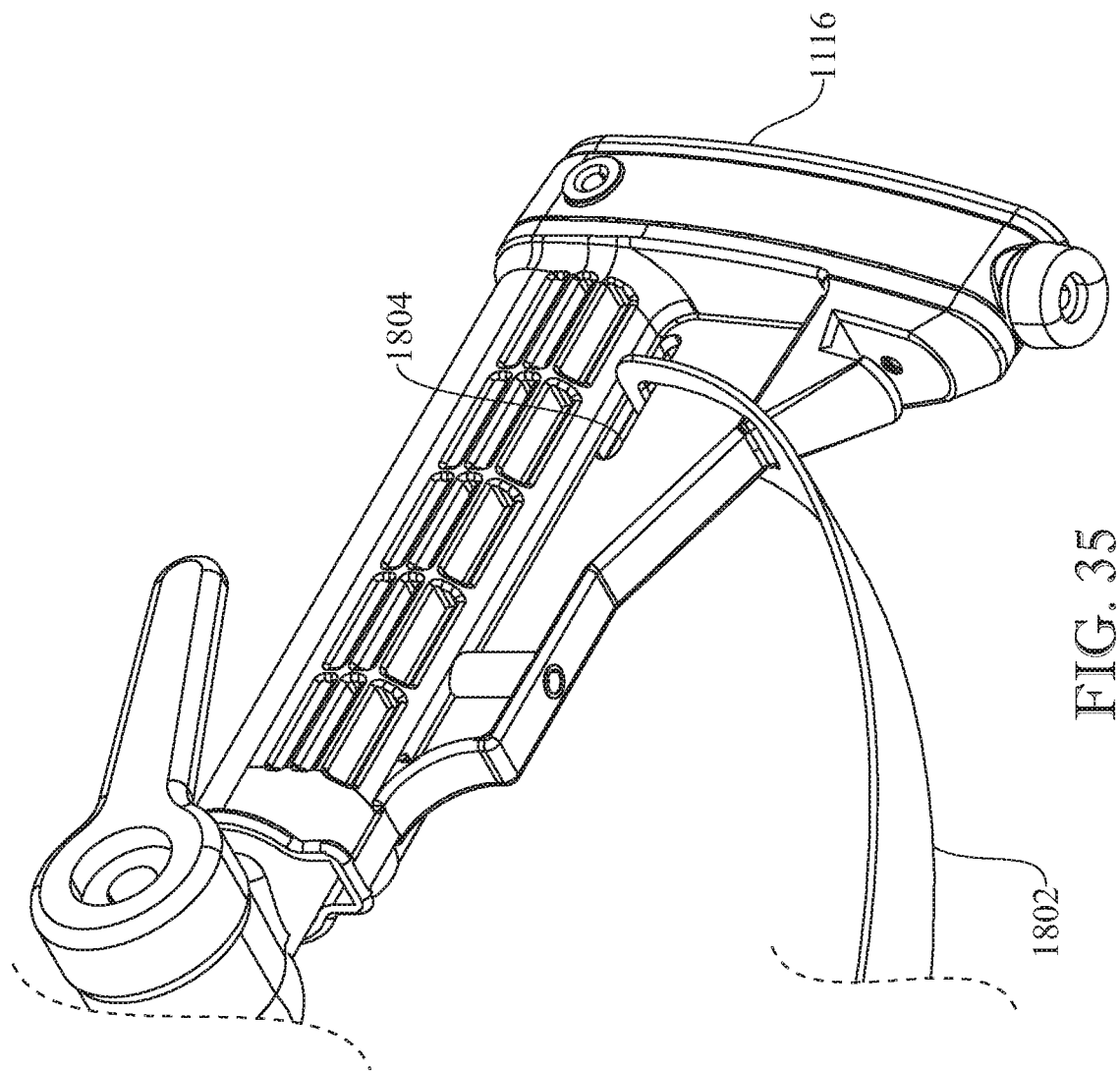

To assist responders in carrying and transporting the handheld measurement, search and safety device 1000, in one embodiment, a buttstock 1116 includes a strap mount 1804 to permit a strap 1802 to be attached thereto, such as is shown in FIGS. 34 and 35, for securement to a person's shoulder. As before, a strap 1802 may comprise a shoulder strap or a handle strap, and the strap 1802 may be adjustable. It will also be understood that one or more buckles or mounts may be provided on either the main frame 1102 or extendable member 1114, or both, to attach one end of a strap 1802, while the other end is attached to the strap mount 1804 on the buttstock 1116. The strap 1802 may comprise any well-known shoulder strap that is typically used with firearms.

As before, a host of different tactical accessories are compatible for use with a handheld measurement, search and safety device 1000 as well. For example, trained personnel may have to survey objects, vehicles, or terrain in low lit or dark areas. To overcome this challenge, responders can easily mount a flashlight anywhere on either or both the main frame 1102 or the extendable member 1114 via one or more of picatinny rails 1106, 1108, 1110, 1112, 1113 or 1128, so as to illuminate the forward direction of trained users and effectively illuminate any surveyed object, person, or target. Still, other applications may require responders to take pictures, determine distances afar, take samples, or check under vehicles for example. In doing so, responders may mount a camera, rangefinder, grippers, and a mirror to the handheld measurement, search and safety device 1000 via any of the picatinny rails provided on either or both the main frame 1102 or the extendable member 1114 giving responders optimum tools needed in hazmat applications. Any combination of tactical accessories and field survey instruments are used with the handheld measurement, search and safety device 1000 when surveying objects, people, buildings, vehicles, or terrain for hazardous materials including toxic chemicals, and radioactive materials.

A handheld measurement, search and safety device 100, 1000 in accordance with the present invention is constructed from a durable, heavy duty material that does not conduct electricity but takes into account characteristics attributed to aesthetics, weight, strength, and ability to electrically insulate. In one non-limiting example, the handheld measurement, search and safety device 100, 1000 may be constructed from any of a synthetic or non-synthetic plastic or polymer plastic, a carbon fiber reinforced plastic polymer or thermoplastic, resins, or dense nylon. The handheld measurement, search and safety device 100, 1000 may be constructed from injection molded processes, 3-D printing processes, casting, or other well-known processes or techniques. In addition, the handheld measurement, search and safety device 100, 1000 may comprise a number of different colors or fluorescent colors, and include any of numbers, letters, characters, symbols, patterns, designs, or logos. There is a strong likelihood that the handheld measurement, search and safety device 100, 1000 will be used in the vicinity of electrical wires, cabinets, or panels, and as such an important features contemplated is to construct the handheld measurement, search and safety device 100, 1000 with materials that do not conduct electricity should the device 100, 1000 come into contact with live electrical wires.

In practice, because trained workers hold instruments in hand, they must come in close proximity to surveyed objects that may contain hazardous materials in order to determine, identify, detect, or measure the physical characteristics of the hazardous materials. In dosing, so workers often find themselves working in uncomfortable, awkward positions or places, maneuvering between objects, searching underneath automobiles, or in areas above head-high, resulting in workers straining muscles, becoming imbalanced, and coming into contact with the hazardous materials tested. A handheld measurement, search and safety device 100, 1000 in accordance with the present invention improves ergonomics by increasing comfort, balance, posture, and safety when performing work, while extending the reach and distance between users and hazardous materials mitigating close and dangerous proximity between the user and hazardous toxic chemicals or radioactive materials. Thus, a handheld measurement, search and safety device 100, 1000 in accordance with the present invention provides greater autonomy by allowing users to place selected field instruments near hazardous materials and operate such instruments remotely at safer distances to mitigate possible exposure, danger, and contact with hazardous materials. As before, a handheld measurement, search and safety device 100, 1000 in accordance with the present invention, is compatible with a large number of field survey instruments, and tactical accessories, without the need for specialized equipment, or for use only with a particular instrument, as provided in conventional prior art devices.

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A handheld measurement, search and safety device for operatively supporting any of a plurality of field instruments and/or tactical accessories as may be required by a user conducting a survey of potentially hazardous persons, places or objects, said device comprising:
    a main frame comprising an elongated configuration and having a channel disposed through at least a portion of a length thereof;
    a handle interconnected to said main frame to facilitate the user's handling of said device while in operation;
    an interchangeable support brace interconnected to a portion of said main frame to further facilitate the user's handling of said device while in operation;
    an extendable member comprising an elongated configuration, said extendable member dimensioned and configured to be at least partially positionable into and out of said channel of said main frame;
    said extendable member comprising a plurality of measurement indices disposed along a length thereof to permit the user to quickly and easily determine an extended length of said device while in use in the field;
    at least one mounting rail affixed to one of said main frame or said extendable member; and
    at least one of the plurality of field instruments or tactical accessories releasably mountable to a portion of said main frame or said extendable member via said at least one mounting rail.

2. The device as recited in claim 1 wherein said interchangeable support brace comprises one of a buttstock or an arm brace.

3. The device as recited in claim 1 wherein at least one of the plurality of field instruments or tactical accessories comprises a measuring tape line mounted to a portion of said main frame via said at least one mounting rail.

4. The device as recited in claim 1 wherein said plurality of measurement indices comprise a plurality of holes disposed along and through at least a portion of said extendable member.

5. The device as recited in claim 4 wherein said plurality of holes are formed through said extendable member at a predetermined distance from one another.

6. The device as recited in claim 5 wherein said predetermined distance is at least partially defined by said plurality of holes being formed through said extendable member such that adjacent ones of said plurality of holes are disposed about one-inch-on-center from one another.

7. The device as recited in claim 1 wherein said plurality of measurement indices comprise a plurality of marks disposed along at least a portion of said extendable member.

8. The device as recited in claim 7 wherein said plurality of marks are disposed along said portion of said extendable member at a predetermined interval apart from one another.

9. The device as recited in claim 8 wherein said predetermined interval is about one inch.

10. The device as recited in claim 1 further comprising a plurality of mounting rails affixed to at least one of said main frame or said extendable member.

11. The device as recited in claim 1 wherein said at least one mounting rail comprises a picatinny, weaver, keymod, or M-Lok mounting rail.

12. The device recited in claim 10 wherein each of said plurality of mounting rails comprises one of a picatinny, weaver, keymod, or M-Lok mounting rail.

13. The device as recited in claim 1 further comprising at least one stabilizer interconnected thereto to stabilize said device while disposed in a generally horizontal orientation.

14. The device as recited in claim 13 wherein said at least one stabilizer comprises one of a bi-pod rod, a bi-pod or a tripod.

15. A handheld measurement, search and safety device for operatively supporting any of a plurality of field instruments and/or tactical accessories as may be required by a user conducting a survey of potentially hazardous persons, places or objects, said device comprising:
    a main frame comprising an elongated configuration and having a channel disposed through at least a portion of a length thereof;

a handle interconnected to said main frame to facilitate the user's handling of said device while in operation;

an extendable member comprising an elongated configuration, said extendable member dimensioned and configured to be at least partially positionable into and out of said channel of said main frame;

said extendable member comprising a plurality of measurement indices disposed along a length thereof to permit the user to quickly and easily determine an extended length of said device while in use in the field;

a plurality of mounting rails affixed to at least one of said main frame or said extendable member; and at least one of the plurality of field instruments or tactical accessories releasably mountable to a portion of said main frame or said extendable member via at least one of said plurality of said mounting rails.

16. The device as recited in claim 15 further comprising an interchangeable support brace interconnected to a portion of said main frame to further facilitate the user's handling of said device while in operation.

17. The device as recited in claim 16 wherein said interchangeable support brace comprises one of a buttstock or an arm brace.

18. The device as recited in claim 15 wherein said plurality of measurement indices comprise a plurality of holes disposed along and through at least a portion of said extendable member at a predetermined distance from one another.

19. The device as recited in claim 15 wherein said plurality of measurement indices comprise a plurality of marks disposed in sequence along at least a portion of said extendable member at a predetermined interval from one another.

20. A handheld measurement, search and safety device for operatively supporting any of a plurality of field instruments and/or tactical accessories as may be required by a user conducting a survey of potentially hazardous persons, places or objects, said device comprising:

a main frame comprising an elongated configuration and having a channel disposed through at least a portion of a length thereof;

a handle interconnected to said main frame to facilitate the user's handling of said device while in operation;

an interchangeable support brace interconnected to a portion of said main frame to further facilitate the user's handling of said device while in operation, said interchangeable support brace comprising one of a buttstock or an arm brace;

an extendable member comprising an elongated configuration, said extendable member dimensioned and configured to be at least partially positionable into and out of said channel of said main frame;

said extendable member comprising a plurality of measurement indices disposed in a predetermined disposition relative to one another along a length thereof to permit the user to quickly and easily determine an extended length of said device while in use in the field, said plurality of measurement indices comprising one of a plurality of holes or a plurality of marks disposed in said predetermined disposition relative to one another along said length of said extendable member;

a plurality of picatinny rails, wherein at least one of said plurality of picatinny rails is affixed to each of said main frame and said extendable member; and at least one of the plurality of field instruments or tactical accessories releasably mountable to a portion of said main frame or said extendable member via at least one of said plurality of said picatinny rails.

\* \* \* \* \*